(12) United States Patent
Matsuhira et al.

(10) Patent No.: US 7,075,932 B2
(45) Date of Patent: Jul. 11, 2006

(54) COMMUNICATION DEVICE FOR SELECTING ROUTE OF PACKET

(75) Inventors: Naoki Matsuhira, Kawasaki (JP); Akira Takeyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 09/769,908

(22) Filed: Jan. 25, 2001

(65) Prior Publication Data

US 2001/0046227 A1  Nov. 29, 2001

(30) Foreign Application Priority Data

May 23, 2000 (JP) ............................. 2000-152064

(51) Int. Cl.
*H04L 12/28* (2006.01)
*G06F 11/00* (2006.01)
*G06F 15/173* (2006.01)

(52) U.S. Cl. .................. 370/395.31; 370/218; 709/239

(58) Field of Classification Search ........ 370/216–218, 370/228, 237, 238.1, 255–258, 295, 351, 370/352, 355, 389, 392, 395.1, 395.31, 395.32, 370/396–404; 379/221.03, 221.04; 395/200.5, 395/200.51, 200.52; 709/238, 239
See application file for complete search history.

(56) References Cited

U.S. PATENT DOCUMENTS

| 4,679,189 | A  | * | 7/1987 | Olson et al. ................. 370/396 |
| 6,038,233 | A  | * | 3/2000 | Hamamoto et al. ......... 370/401 |
| 6,243,384 | B1 | * | 6/2001 | Eriksson et al. ....... 370/395.31 |
| 6,611,522 | B1 | * | 8/2003 | Zheng et al. .......... 370/395.21 |
| 2004/0015590 | A1 | * | 1/2004 | Nagami et al. ............. 709/227 |
| 2004/0042402 | A1 | * | 3/2004 | Galand et al. ............. 370/237 |

FOREIGN PATENT DOCUMENTS

JP  05153548  6/1993

* cited by examiner

*Primary Examiner*—Frank Duong
*Assistant Examiner*—John Shew
(74) *Attorney, Agent, or Firm*—Katten Muchin Rosenman LLP

(57) ABSTRACT

A communication device includes a static routing table, a dynamic routing table and a judging unit. The judging unit, if no failure occur in a static route, selects the static route based on routing information given from the static routing table as a route to which a packet should be forwarded. The judging unit, if the failure occurs in the static route, selects a dynamic route based on routing information given from the dynamic routing table as a route to which the packet should be forwarded.

32 Claims, 30 Drawing Sheets

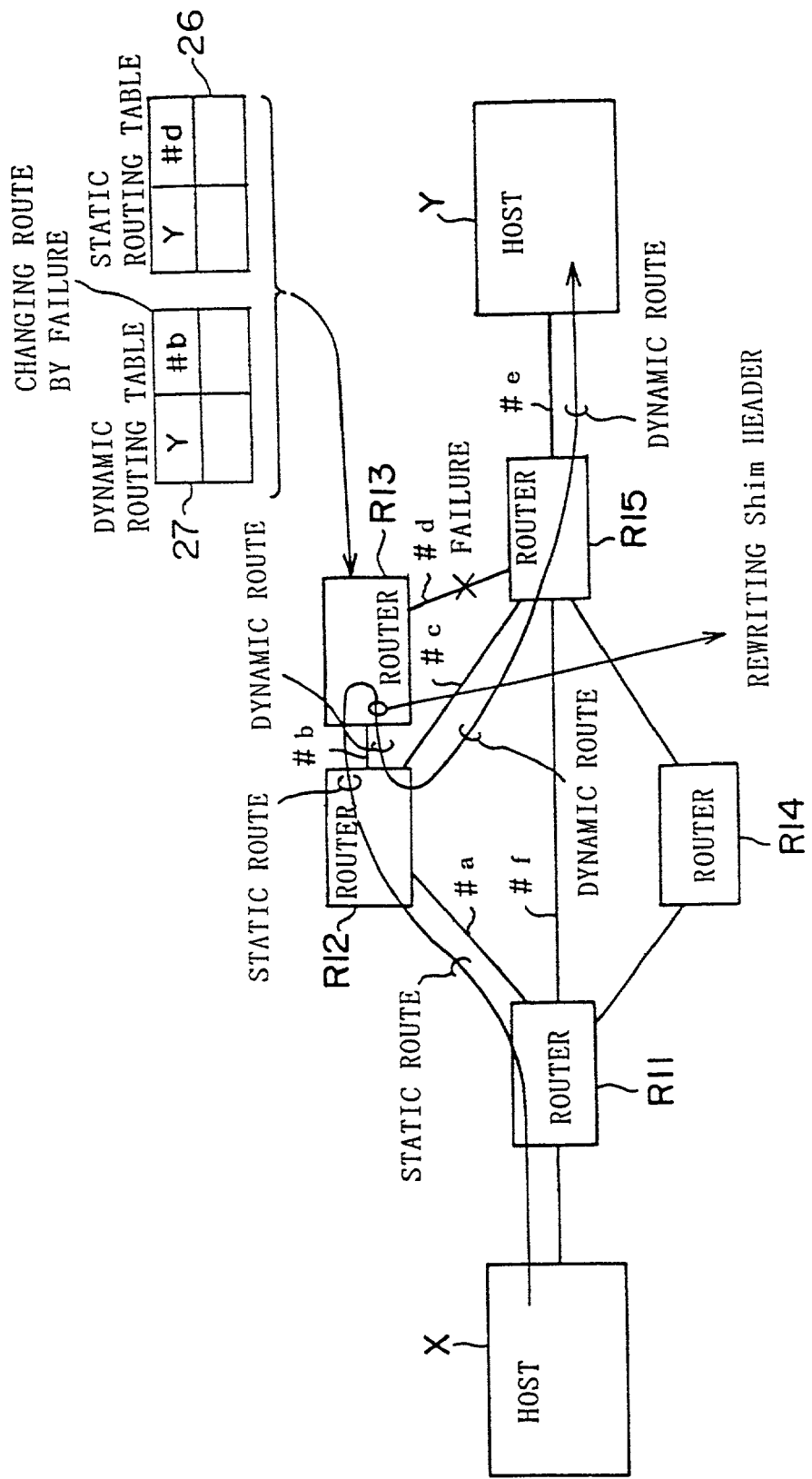

COMMUNICATION DEVICE FOR SELECTING ROUTE OF PACKET

BACKGROUND OF THE INVENTION

1. Field of the Invention

The present invention relates to a communication device for selecting a route of a packet in a packet switching network comprising an IP (Internet Protocol) network such as the Internet, intranets etc.

2. Description of the Related Art

The Internet is a data network in which the terminals are mutually connected worldwide. The Internet users rapidly increase. What is characteristic of the Internet is that routing is executed based on an IP datagram (IP packet) as an unit, and a connection is not set at an IP level.

In the Internet, the IP packets are forwarded by reference to a routing table in which to describe a destination address and a next hop (router) corresponding to the destination address. The destination address contains a piece of address mask information in order to make searchable a network unit of the destination or a predetermined aggregated unit.

In general, means for creating the routing table involves the use of a dynamic routing protocol such as RIP (Routing Information Protocol), OSPF (Open Shortest Path First) and so on. Main objects of the use of dynamic routing are to automate designing of routes of packets and to dynamically react to extension and failure of nodes and links. Dynamic routing aims at creating a routing table. The routing table based on dynamic routing is created in a way that a distributed algorithm resolves such a spanning tree as to minimize a router's cost (Metric) in the network. RIP and OSPF account for a hop count (the number of routers to the destination) as a cost needed for creating the routing table but do not account for a network's load etc as a cost.

On the other hand, there is used a method by which an operator (e.g., a network administrator) manually writes entries to the routing table. This method is known as static routing in contrast with dynamic routing.

According to dynamic routing, the cost is recalculated corresponding to a change in topology of the network due to extension or failure of the nodes and the links, and the routing table is automatically updated corresponding to a result of the recalculation.

By contrast, according to static routing, even if the topology changes, the contents of the routing table are not changed as far as the operator does not update the routing table. Therefore, according to static routing, the operator must update the routing table when the topology changes. So far as the operator does not acknowledge, the contents of the routing table are not changed. Hence, intentional control of the operator (which is called a "policy") can be reflected in the network.

According to dynamic routing, even when there exist a plurality of routes from a certain network to other network, the spanning tree is that there is only one route for minimizing the hop count. Namely, only one route for minimizing the hop count is selected (by a spanning tree algorithm) among the plurality of routes.

An allowable capacity of route (load to the network) has hitherto not been considered for selecting the route. Therefore, if traffic exceeding the allowable capacity of the selected route occur, packets of the traffic over the allowable capacity are discarded.

A main stream in the Internet may be served for providing only connectivity (reachability of the packet). Only the reachability of IP packet to a destination of the communication is secured by endorsing the connectivity.

On the other hand, what has been required over the recent years may be services for guaranteeing predetermined communication qualities such as data communication services for securing, VoIP (Voice over IP: IP network based voice communications), and a video transfer and so on. Some sort of policy must be reflected in the network in order to actualize the services for guaranteeing the communication qualities.

Herein, if static routing is adopted, the predetermined policy can be reflected in the network. According to static routing, however, the operator must update the routing table. Static routing is therefore incapable of quickly troubleshooting failure in the network.

SUMMARY OF THE INVENTION

It is a primary object of the present invention to provide a communication device capable of reflecting a policy if failure do not occur in a route, and securing reachability of packets even if the failure occur in the route.

To accomplish the above object, according to one aspect of the present invention, a communication device for selecting a route of a packet comprises a static routing table storing first routing information of the packet based on static routing; a dynamic routing table storing second routing information of a packets obtained based on a dynamic routing protocol; and a judging unit obtaining the first and second routing information corresponding to a packet are obtained from the static routing table and the dynamic routing table; if failure do not occur in a static route as a route corresponding to the first routing information, selecting the static route as a route to which the packet should be forwarded; and selecting, if the failure occur in the static route, a dynamic route as a route corresponding to the second routing information obtained from the dynamic routing table, instead of the static route.

According to the present invention, if the failure do not occur in the static route corresponding to the first routing information obtained from the static routing table, the static route is selected as the route to which the packet should be forwarded. Whereas if the failure occur in the static route, the dynamic route corresponding to the second routing information obtained from the dynamic routing table, is selected.

With this contrivance, if no failure (fault) occur in the static route (normal time), the packet is forwarded to the static route, thereby a policy is reflected. If the failure (fault) occur in the static route, the packet is forwarded to the dynamic route, whereby the reachability of the packets can be secured.

BRIEF DESCRIPTION OF THE DRAWINGS

FIG. 30 is a diagram showing an example of the communications using the communication device in the embodiment.

DESCRIPTION OF THE PREFERRED EMBODIMENTS

Embodiments of the present invention will hereinafter be described with reference to the accompanying drawings.

First Embodiment

To start with, a communication device in a first embodiment of the present invention will be explained.

[Construction]

Figure 26:
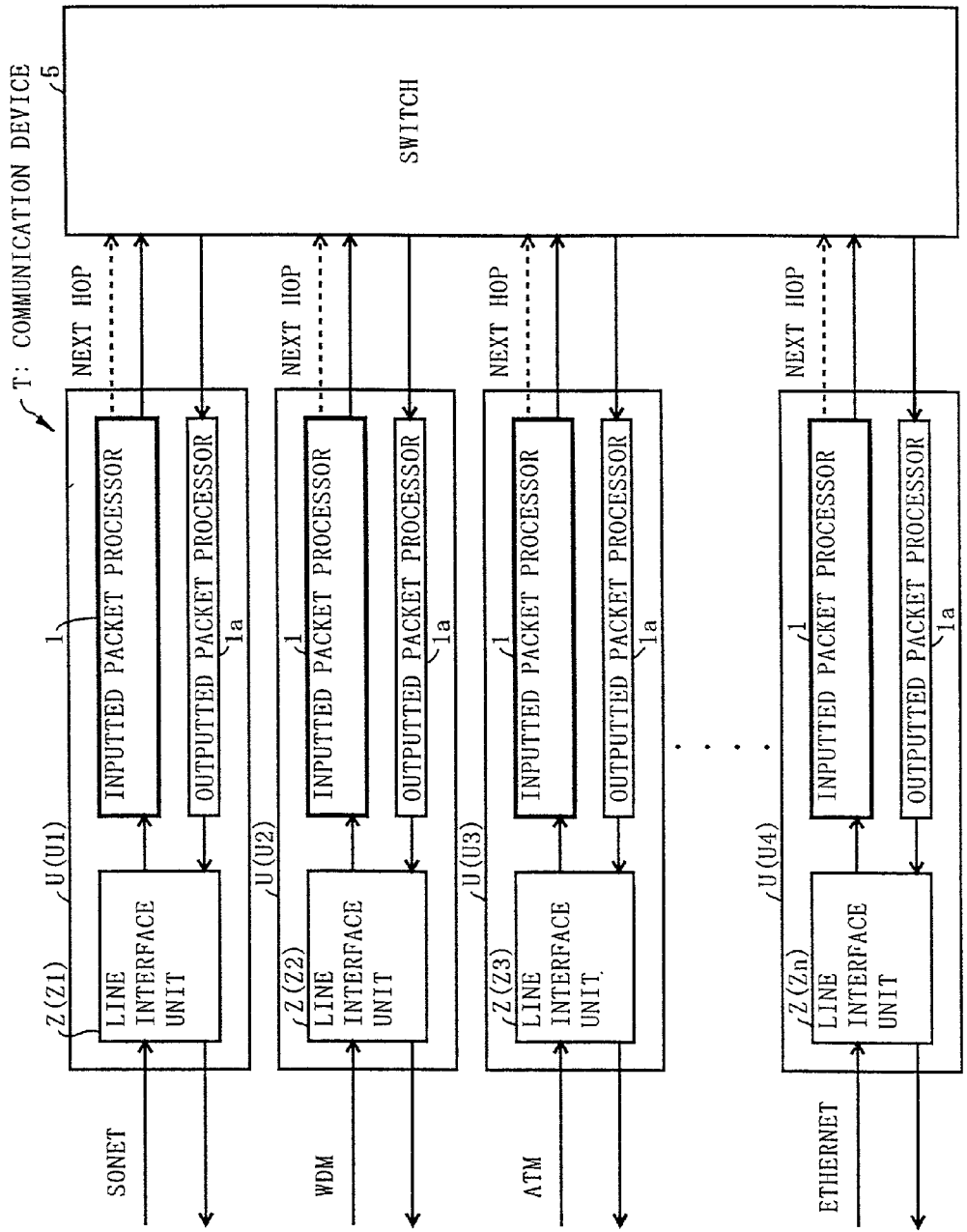
FIG. 26 is a diagram showing construction of a communication device in the embodiment.

FIG. 26 is a diagram showing construction of a communication device T. the present invention is applied in the form of the communication device T to, for example, a router (gateway) and a label switch such as a layer 3 switch, MPLS (Multi Protocol Label Switching) etc.

Referring to FIG. 26, the communication device T includes a switch 5 and a plurality (n-pieces) of packet processing units U (U1, U2, U3, . . . , Un). Each of the packet processing units U has a line interface unit Z, an inputted packet processor (inputted packet processing unit) 1 and an outputted packet processor (outputted packet processing unit) 1a, which are respectively connected to the switch 5.

Each of the line interface unit Z (Z1, Z2, Z3, . . . , Zn) is an interface connected to other communication device through a communication line and corresponding the standard of a communication line serving as a packet transmission path. In an example shown in FIG. 26, the line interface unit Z1 accommodates a SONET (Synchronous Optical Network) circuit. The line interface unit Z2 accommodates a WDM (Wavelength Division Multiplexing) circuit. The line interface unit Z3 accommodates an ATM (Asynchronous Transfer Mode) circuit. The line interface unit Zn accommodates an Ethernet circuit.

Each line interface unit Z converts a packet forwarded via the communication line into a format in which the packet can be processed by the inputted packet processor 1, and inputs the thus converted packet to the inputted packet processor 1. On the other hand, each line interface unit Z converts the packet inputted from the outputted packet processor 1a into a format in which the packet can be forwarded to the communication line accommodated in the interface unit Z itself, and forwards the converted packet to the communication line.

Each inputted packet processor 1 determines a route (next hop) via which the packet inputted from the corresponding line interface unit Z should be forwarded, and inputs the packet to the switch 5. Each outputted packet processor 1a executes a necessary process on the packet inputted from the switch 5, and thereafter inputs the packet to the line interface unit Z.

Figure 1:
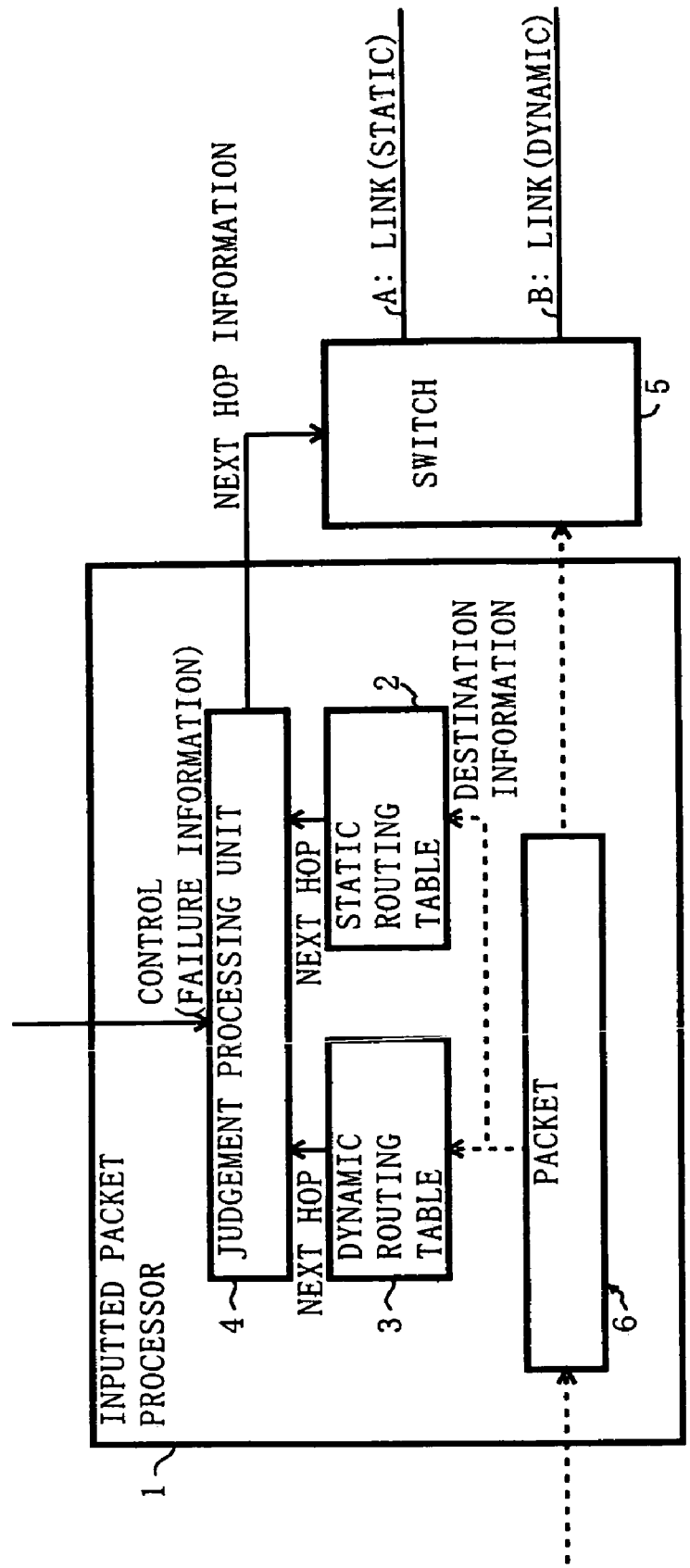
FIG. 1 is a diagram showing construction of an inputted packet processor in a first embodiment.

FIG. 1 is a diagram sowing showing construction of the inputted packet processor 1 shown in FIG. 26. Referring to FIG. 1, the inputted packet processor 1 comprises a static routing table 2, a dynamic routing table 3 and a judgement processing unit (corresponding to a judging unit) 4.

The static routing table 2 is a routing table created based on static routing. The static routing table 2 contains pieces of next hop information (corresponding to first routing information of a packet), for guiding a packet 6 to its destination, written by an operator (network administrator) of the communication device T. The next hop information is set so that a policy of guaranty etc of a communication quality such as QoS (Quality of Service) reflects in the network.

The dynamic routing table 3 is a routing table created based on dynamic routing. The dynamic routing table 3 is created according to a routing protocol such as RIP, OSPF etc. The dynamic routing table 3 contains next hop information (corresponding to second routing information of a packet) corresponding to destination information (which corresponds to a common search key) of the packet 6.

The next hop information retained (stored) in the dynamic routing table 3 is updated so that a cost of a route relating to the destination of the packet 6 is minimized according to a change in terms of topology of the network to which the communication device T is connected.

The switch 5 forwards the inputted packet to a packet processing unit Y accommodating a link corresponding to the next hop information. With this routing, the switch 5 is in principle in such a state that links for connecting the communication device T to other communication devices are established. Referring again to FIG. 1, the switch 5 establishes a link (route) A specified in the static routing table 1, and a link (route) B specified in the dynamic routing table 2.

The judgement processing unit 4 selects which table, the static routing table 2 or the dynamic routing table 3, is to be used on the basis of failure (fault) information detected or under the control of the operator of the communication device T. To be more specific, the judgement processing unit 4, if no failure occur in the link (route) A, selects the next hop information from the static routing table 2. By contrast, the judgement processing unit 4, if a failure occur in the link (route) A, selects the next hop information from the dynamic routing table 3.

The judgement processing unit 4, if the failure is discovered by a fault detecting unit incorporated into each link or by an existing technology such as connection monitoring of PPP (Point-to-Point Protocol), receives a signal indicating this failure. Further, the judgement processing unit 4 receives a signal relative to an selective indication given from the operator.

Note that the judgement processing unit 4 may make a judgement as to failure of any one link in the communication device T, and may also make a judgement as to the packets that should be transferred to the link having failure. In the latter case, the judgement processing unit 4 is notified of data about a hop (router) in which the fault occur, and the judgement can be made by comparing this piece of fault hop information with the next hop information taken out of the routing table.

Further, if the failure occur in any one of a plurality of links existing a static route between the communication device T and a destination of the packet, the judgement processing unit 4 may select the next hop information from the dynamic routing table 3.

The inputted packet processor 1 (the static routing table 2, the dynamic routing table 3 and the judgement processing unit 4) may be actualized by either hardware or software. It is, however, preferable in terms of gaining a faster processing speed than by software that the inputted packet processor 1 is configured by hardware (e.g., ASIC (Application Specific Integrated Circuit)).

<Function>

Functions of the inputted packet processor 1 will be explained. Referring to FIG. 1, when the inputted packet processor 1 receives the packet 6, destination information of the packet 6 as a search key contained in the packet 6 are respectively inputted to the routing tables 2 and 3. On the other hand, the packet 6 itself is inputted to the switch 5.

The static routing table 2 inputs the next hop information (the information of the link (route) A) corresponding to the inputted destination information of the packet 6 to the judgement control unit 4. Further, the dynamic routing table 3 inputs, to the judgement control unit 4, the next hop information (the information of the link B) corresponding to the inputted destination information of the packet 6.

The judgement processing unit 4, when receiving the next hop information from the static routing table 2 and the dynamic routing table 3, judges whether the failure information of the link A is being inputted or has been inputted to the judgement processing unit 4 itself.

At this time, the judgement processing unit 4, when not receiving the failure information, inputs the next hop information received from the static routing table 2 to the switch 5. Whereas if receiving the failure information, the judgement processing unit 4 inputs the next hop information received from the dynamic routing table 3 to the switch 5.

The switch 5, based on the next hop information received from the judgement processing unit 4, forwards the inputted packet 6 to one of the links A and B. That is, the switch 5, when receiving the next hop information in the static routing table 2, forwards the packet 6 to the link A. In contrast with this, the switch 5, when receiving the next hop information in the dynamic routing table 3, forwards the packet 6 to the link B.

Thus, in the inputted packet processor 1, when it can be transferred the packet 6 to a certain destination by use of any one of the links A and B, if no failure occur in the link (route) A, the link A is priority selected as a route to the destination. On the other hand, if failure occur in the link A, the link (route) B is selected as a route to the destination.

<Operation>

In accordance with the first embodiment, when the predetermined communication services (for example, VoIP, transferring of video (movie) information, and data communication services for guaranteeing capability of the services), the communication device T guarantees the communication quality such as QoS (Quality of Service) by preparing the route (link A) set by static routing added with QoS. If the failure occur on the route (link A) specified by static routing, the route (link B) created by dynamic routing is selected. Thereby reachability of packets can be secured even if unable to guarantee an agreed QoS, when the failure occur. Thereby, each of the inputted packet processor in the embodiments functions as a first route selecting unit and a second route selecting unit.

Figure 27:
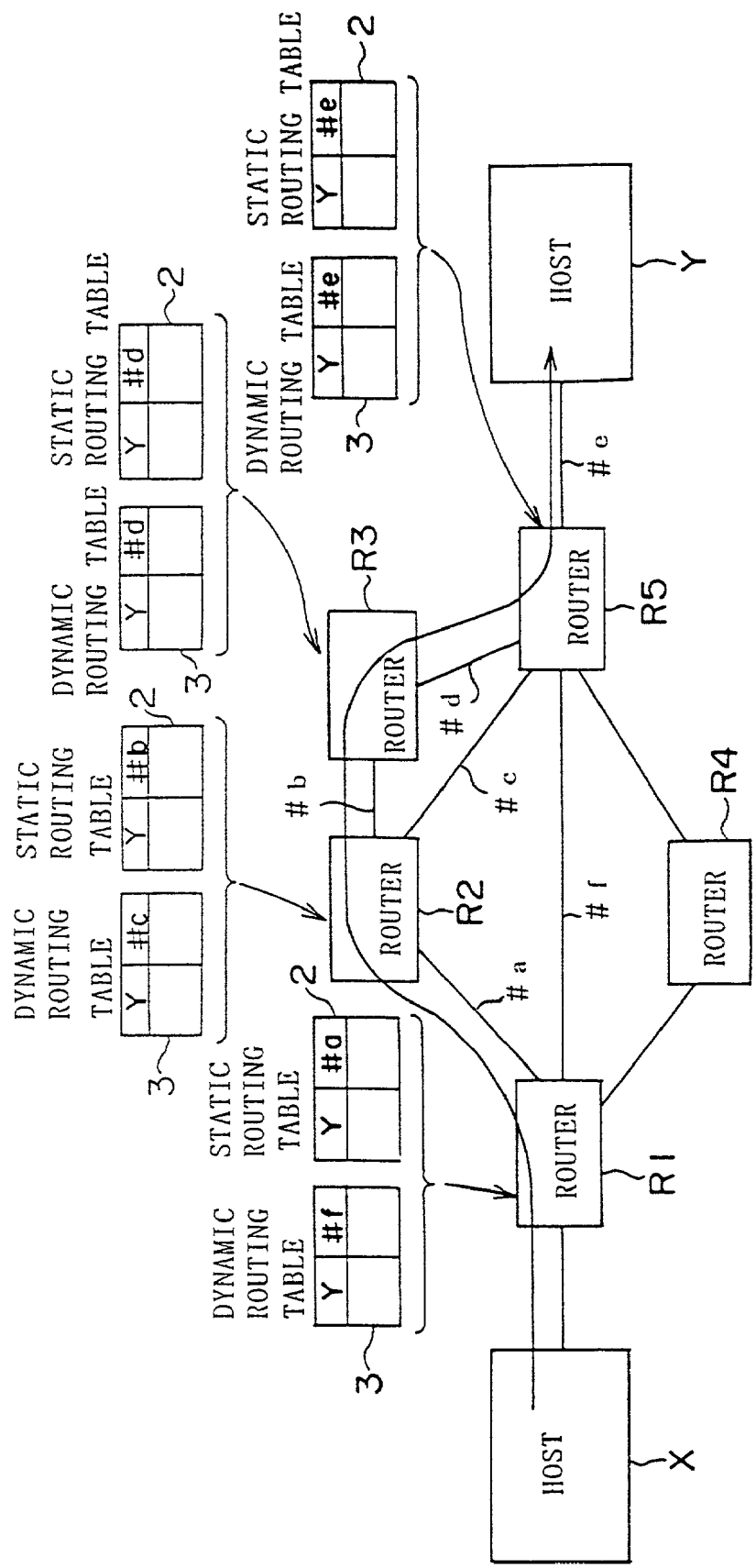
FIG. 27 is a diagram showing an example of communications using the communication device in the embodiment.

Referring to FIG. 27, a network is configured by connecting a plurality of routers R1–R5 corresponding to the communication devices T to each other via communication lines. A host (terminal device) X is connected to the router R1, and a host (terminal device) Y is connected to the router R5.

The static routing table 2 held by the router R1 is stored with link information relating to a line number "a" (which will hereinafter be referred to as "link #a") as a piece of next hop information corresponding to the host Y. The dynamic routing table 3 is stored with link information relating to a line number "f" (which will hereinafter be referred to as "link #f") as a piece of next hop information corresponding to the host Y.

Further, the static routing table 2 held by the router R2 is stored with link information relating to a line number "b" (which will hereinafter be referred to as [link #b]) as a piece of next hop information corresponding to the host Y. The dynamic routing table 3 is stored with link information relating to a line number "c" (which will hereinafter be referred to as "link #c") as a piece of next hop information corresponding to the host Y.

Moreover, the static routing table 2 and the dynamic routing table 3 held by the router R3 are each stored with link information relating to a line number "d" (which will hereinafter be referred to as "link #d") as a piece of next hop information corresponding to the host Y.

The static routing table 2 and the dynamic routing table 3 held by the router R5 are each stored with link information relating to a line number "e" (which will hereinafter be referred to as "link #e") as a piece of next hop information corresponding to the host Y.

When the packet is forwarded from the host X to the host Y, the router R1 receives the packet 6 forwarded from the host X at first. The router R1 judges whether or not the failure occur in the link #a selected by the static routing. The router R1, when judging that no failure occur therein, forwards the packet 6 to the router R2 via the link #a in accordance with the next hop information corresponding to the host Y, which is stored in the static routing table 2.

The router R2, when receiving the packet 6 from the router R1, judges whether or not the failure occur in the link #b selected by the static routing. The router R2, when judging that no failure occur therein, forwards the packet 6 to the router R3 via the link #b in accordance with the next hop information corresponding to the host Y, which is stored in the static routing table 2.

The router R3, when receiving the packet 6 from the router R2, judges whether or not the failure occur in the link #d selected by the static routing. The router R3, when judging that no failure occur therein, forwards the packet 6 to the router R5 via the link #d in accordance with the next hop information corresponding to the host Y, which is stored in the static routing table 2.

The router R5, when receiving the packet 6 from the router R3, judges whether or not the failure occur in the link #e selected by the static routing. The router R5, when judging that no failure occur therein, forwards the packet 6 to the host Y via the link #e in accordance with the next hop information corresponding to the host Y, which is stored in the static routing table 2.

Thus, the each of the routers R1–R3 and R5, if no failure occur in the link (static route) selected by static routing, forwards the packet 6 to the static route.

Figure 28:
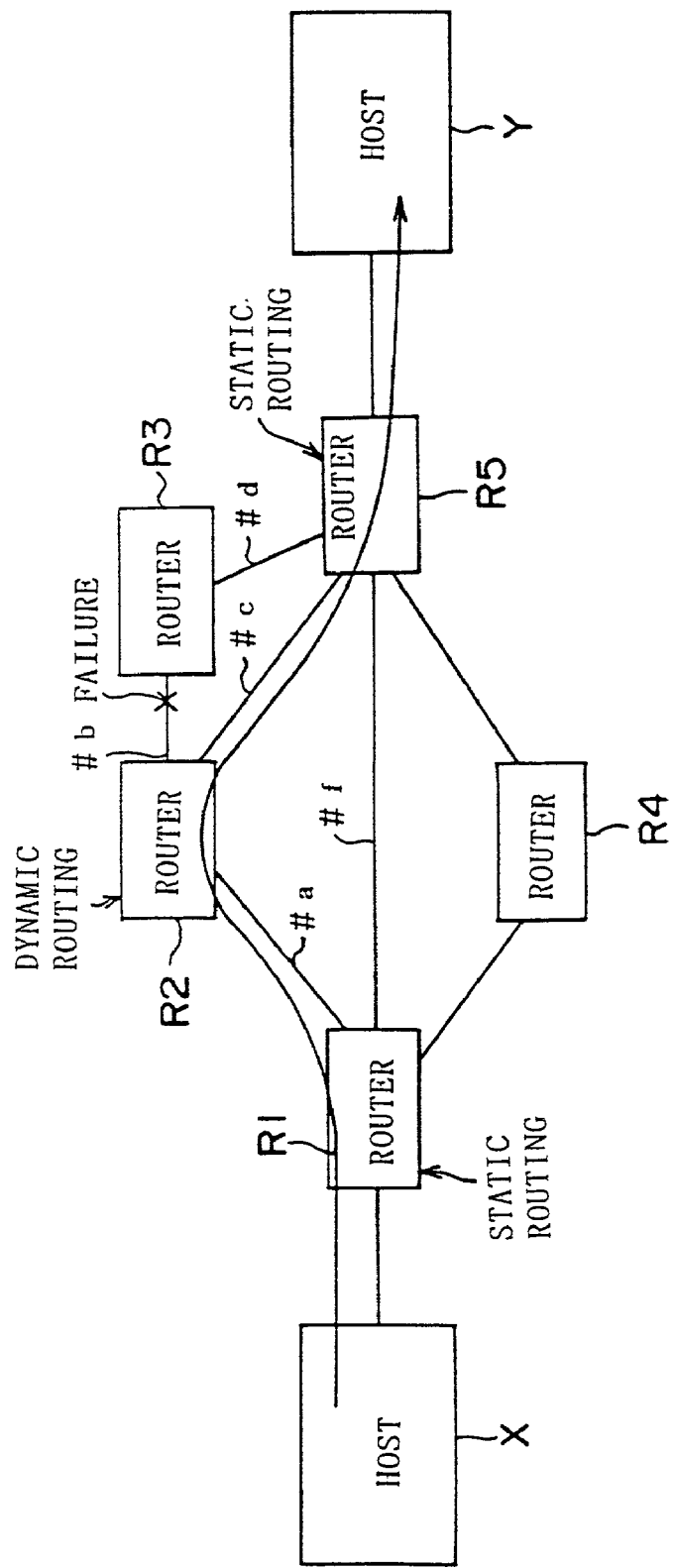
FIG. 28 is a diagram showing an example of the communications using the communication device in the embodiment.

FIG. 28 is a diagram showing an example of communications in a case where a failure of a static route occur (cause) in the network system shown in FIG. 27. As shown in FIG. 28, it is assumed that the failure occur in the link #b for the duration of forwarding the packet 6 to the host Y from the host X.

In this case, the router R2 discovers the failure in the link #b, and, when receiving the packet 6 from the router R1, judges that the failure occur in the link #b corresponding to the static route. Then, the router R2 forwards the packet 6 to the router R5 via the link #c in accordance with the next hop information corresponding to the host Y, which is stored in the dynamic routing table 3 (see FIG. 27).

The router R5, when receiving the packet 6 from the router R2, judges whether or not the failure occur in the link #e selected by static routing. The router R5, when judging that no failure occur therein, forwards the packet 6 to the host Y via the link #e in accordance with the next hop information corresponding to the host Y, which is stored in the static routing table 2.

Figure 29:
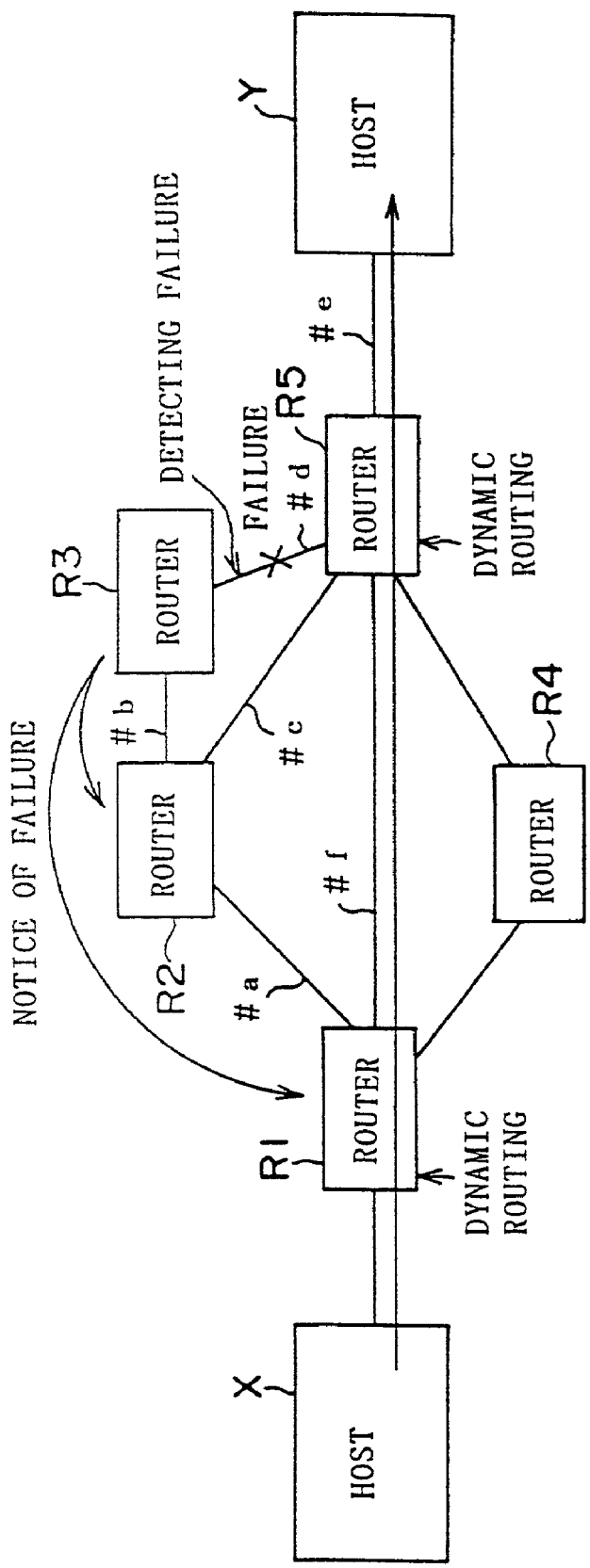
FIG. 29 is a diagram showing an example of the communications using the communication device in the embodiment.

FIG. 29 is a diagram showing another example of communications in the case where the failure occur in the static route in the network system shown in FIG. 27. As shown in FIG. 29, the failure occur in the link #d, and, when the router R3 detects this failure, the router R3 notifies of the failure each of the routers R1, R2 existing anterior to the router R3 itself on the static route from the host X to the host Y.

Thereafter, the router R1 receives the packet 6 addressed to the host Y which has been forwarded from the host X. The router R1 selects the next hop information out of the dynamic routing table 3 (see FIG. 27) on the basis of the failure notification from the router R3. The router R1 forwards the packet 6 to the router R5 via the link #f in accordance with this piece of hop information.

The router R5, when receiving the packet 6 from the router R1, forwards the packet 6 to the host Y via the link #e in accordance with the next hop information corresponding to the host Y, which is stored in the static routing table 2.

Thus, even if the failure occur in the static route (host X→router R1→link #a→router R2→link #b→router R3→link #d→router R5→link #e→host Y), the packet 6 can be forwarded to the host Y, and the packet reachability can be secured.

Note that as a substitute for the examples explained in FIGS. 28 and 29, each of the routers R1~R5 (the router R5 in the examples in FIGS. 28 and 29), when receiving the packet 6 forwarded via the dynamic route, may forward the packet 6 to the host Y via the link #e in accordance with the next hop information corresponding to the host Y, which is stored in the dynamic routing table 3. Any one of the existing technologies may be used as a method of detecting the failure in the link #b or the link #d in order for the router R5 to select the dynamic route.

Second Embodiment

Next, the communication device in a second embodiment of the present invention will be described. The second embodiment is substantially the same as the first embodiment, except for the construction of the inputted packet processor, and therefore the discussion will be focused on the inputted packet processor.

Figure 2:
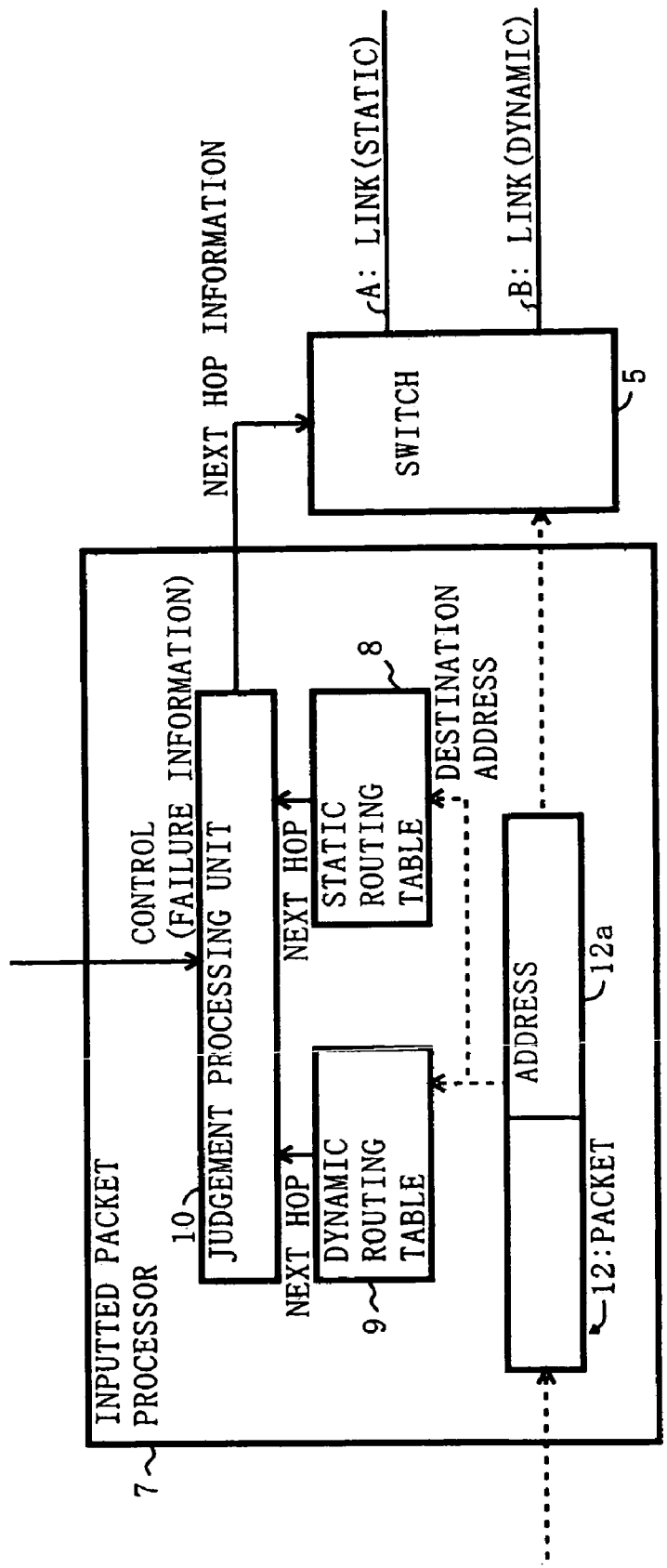
FIG. 2 is a diagram showing construction of the inputted packet processor in a second embodiment.

FIG. 2 is a diagram showing construction of an inputted packet processor 7 provided in the communication device in the second embodiment. The communication device in the second embodiment receives a packet 12. In the inputted packet processor 7, a destination address 12a contained in the packet 12 is inputted, as a common search key, to a static routing table 8 and a dynamic routing table 9 as well.

Then, each of the routing tables 8 and 9 functions to input a piece of next hop information corresponding to the inputted destination address, to the judgement processing unit 4. Excluding the points described above, the construction and functions of the inputted packet processor 7 are the same as those of the inputted packet processor 1.

In the inputted packet processor 7 in the second embodiment, corresponding next hop information is searched from each of the routing tables 8 and 9 by use of the same information (the same field contained in the packet) contained in a certain field in the packet.

Third Embodiment

Next, the communication device in a third embodiment of the present invention will be discussed. The third embodiment is substantially the same as the first embodiment, except for the construction of the inputted packet processor, and therefore the discussion will be focused on the inputted packet processor.

As one category of static routing, a method of adding information for actualizing a virtual circuit into IP datagram (IP packet) may be considered other than the method of directly describing the entry in the routing table.

The virtual circuit is defined as a technology that has been used in the asynchronous transfer mode (ATM) etc, wherein two points, i.e., a start point and an end point, are connected by the virtual circuit, identification information of a route to the end point is added into the data transferred between those two points, and a node existing on the virtual circuit forwards the data to the route (leading to the end point) based on the identification information.

An approach to an execution of virtual circuit based routing by adding the identification information of the virtual circuit into the IP packet, has been considered over the recent years. According to this approach, the IP packet is transferred through the set virtual circuit, and hence this may be conceived as one category of static routing. A mpls shim header in MPLS (Multiple Protocol Label Switching) may be one example of the virtual circuit technology.

Figure 3:
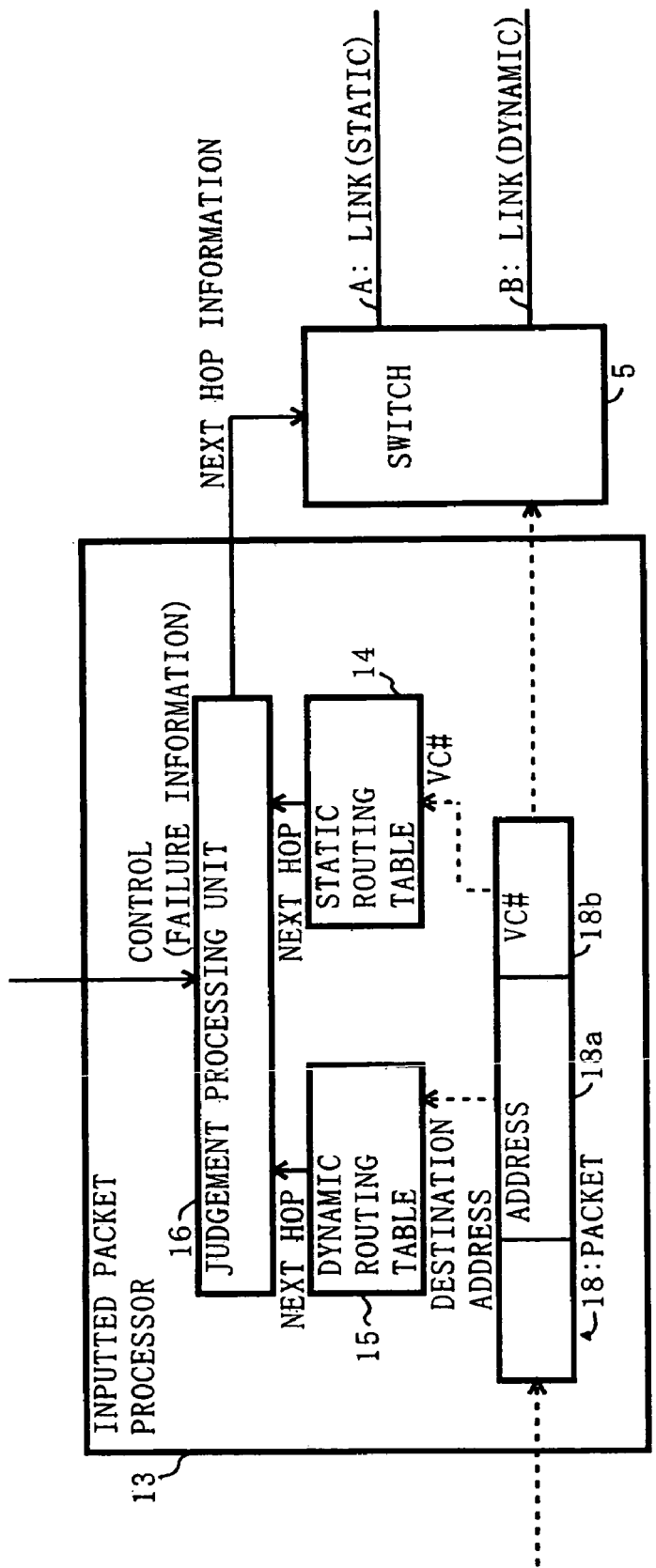
FIG. 3 is a diagram showing construction of the inputted packet processor in a third embodiment.

FIG. 3 is a diagram showing construction of an inputted packet processor 13 provided in the communication device in the third embodiment. The inputted packet processor 13 reflects a policy in the network by static routing that involves the use of the virtual circuit.

Therefore, a packet 18 received (inputted to the inputted packet processor 13) by the communication device in the third embodiment, contains a packet destination address (corresponding to a unique destination address as a second search key) 18a and a virtual circuit number (corresponding to virtual circuit information as a first search key) 18b as pieces of destination information. The first and second search keys may be global and unique destination addresses respectively.

When the packet 18 is inputted to the inputted packet processor 13, the virtual circuit number 18b contained in the packet 18 is inputted to a static routing table 14. The static routing table 14 functions to input, to a judgement processing unit 16, a piece of next hop information (information of the link A) corresponding to the virtual circuit number 18b.

On the other hand, the destination address 18a in the packet 18 is inputted to a dynamic routing table 15. The dynamic routing table 15 functions to input, to the judgement processing unit 16, a piece of next hop information (information of the link B) corresponding to the destination address 18a.

The judgement processing unit 16 receives pieces of next hop information from the dynamic routing table 15 and the static routing table 14 as well. At this time, the judgement processing unit 16, if failure information about the link A is not received, supplies a switch 5 with the next hop information corresponding to the virtual circuit number 18b.

Then, the switch 5 forwards the inputted packet 18 to the link A in accordance with the next hop information received from the judgement processing unit 16. The packet 18 is thereby transmitted on the virtual circuit down to a communication device (host) as the end point.

By contrast, the judgement processing unit 16, if the failure information about the link A is received when receiving the next hop information from the routing tables 14 and 15, inputs the next hop information corresponding to the destination address 18a to the switch 5. The switch 17 forwards the inputted packet 18 to the link B in accordance with the next hop information received from the judgement processing unit 16.

Thus, the inputted packet processor 13, if no failure occurs in the link A, reflects the policy in the network by forwarding the packet 18 by use of the virtual circuit.

Whereas if the failure occur in the link A, the inputted packet processor 13 detects the next hop information based on dynamic routing in accordance with the destination address 18a in the packet 18, and forwards the packet 18 to the link (B) corresponding to the detected information. With this operation, as in the first embodiment, even if the failure occurs in the link A, the reachability of the packet 18 can be secured.

Fourth Embodiment

Next, the communication device in a fourth embodiment of the present invention will be discussed. The fourth embodiment is substantially the same as the third embodiment, except for the construction of the inputted packet processor, and therefore the discussion will be focused on the inputted packet processor.

Figure 4:
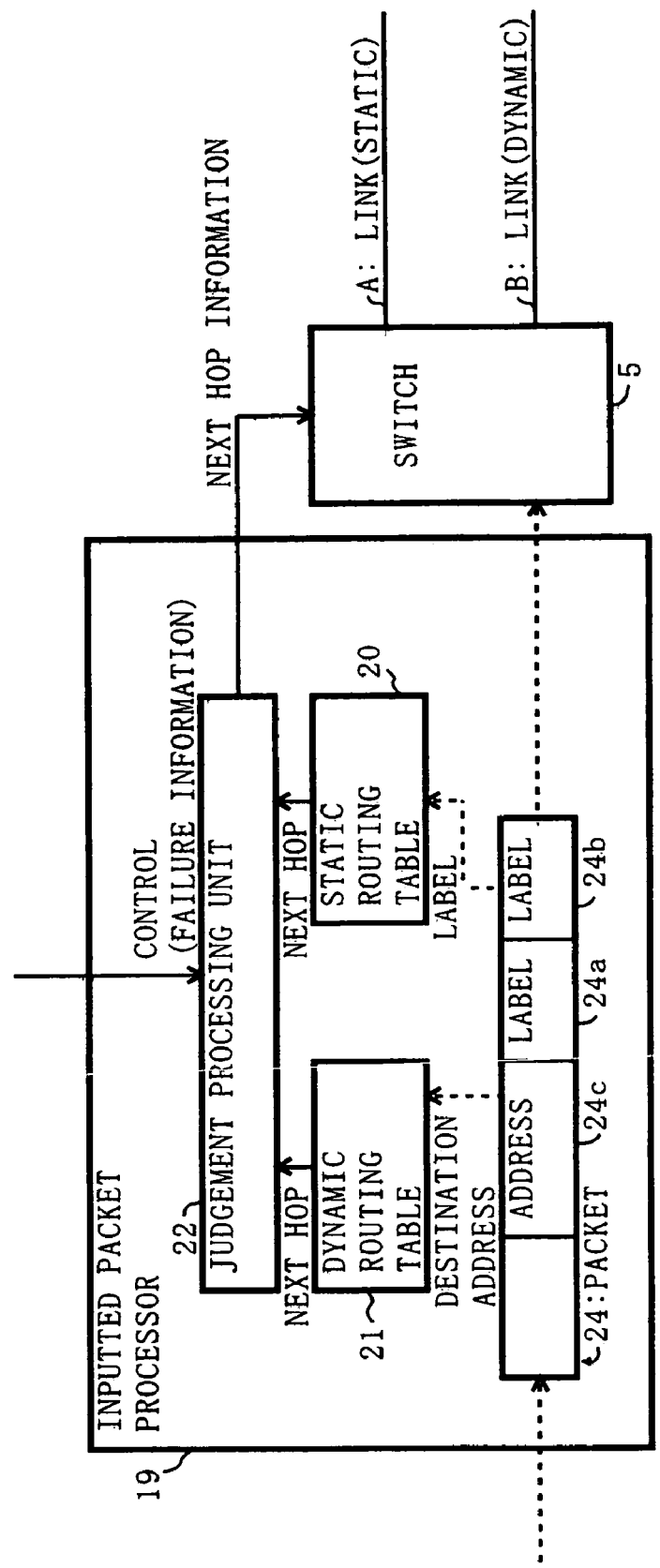
FIG. 4 is a diagram showing construction of the inputted packet processor in a fourth embodiment.

FIG. 4 is a diagram showing construction of an inputted packet processor 19 provided in the communication device in the fourth embodiment. The inputted packet processor 19 reflects the policy in the network by MPLS-based static routing as one of the virtual circuit technologies.

A packet 24 is received (inputted to the inputted packet processor 19) by the communication device in the fourth embodiment, contains labels 24a, 24b (corresponding to plural pieces of virtual circuit information) used as pieces of route identification information when selecting a route (label switching) in MPLS, and a destination address 24c of the packet 24.

The labels 24a, 24b and the destination address 24c are stored in a header of the packet 24 by way of an example. Thus, the protocol related to MPLS permits that the two labels are stored in the header.

When the packet 24 is inputted to the inputted packet processor 19, the label 24a stored in a front-side field of the header of the packet 24 is inputted as a first search key to a static routing table 20. The static routing table 20 functions to input the next hop information (link A) corresponding to the label 24a to a judgement processing unit 22.

On the other hand, the destination address 24c in the packet 24 is inputted as a second search key to a dynamic routing table 21. The dynamic routing table 21 functions to input the next hop information (link B) corresponding to the destination address 24c to the judgement processing unit 22.

The judgement processing unit 22 receives pieces of next hop information from the dynamic routing table 21 and the static routing table 20 as well. If the failure information about the link A is not received, the judgement processing unit 22 supplies a switch 5 with the next hop information corresponding to the label 24a.

Then, the switch 5 forwards the inputted packet 24 to the link A in accordance with the next hop information received from the judgement processing unit 22. By contrast, the judgement processing unit 22, if the failure information about the link A is received, inputs the next hop information corresponding to the destination address 24c to the switch 5. The switch 5 forwards the inputted packet 24 to the link B in accordance with the next hop information received from the judgement processing unit 22.

Thus, the inputted packet processor 19 in the fourth embodiment, if no failure occur in the link A, reflects the policy in the network by forwarding the packet 24 by MPLS-based label switching.

Whereas if the failure occur in the link A, the inputted packet processor 19 detects the next hop information based on dynamic routing in accordance with the destination address 24c, and forwards the packet 24 to the link (e.g., link B) corresponding to the detected information. With this operation, as in the third embodiment, even if the failure occur in the link A, the reachability of the packet 24 can be secured, and substantially the same effects as those in the third embodiment can be obtained.

Note that the inputted packet processor 19 is capable of executing the above processes on a packet stored with no label 24b. Further, as a substitute for the mode described above, the label 24b may also be inputted to the static routing table 20.

Fifth Embodiment

Next, the communication device in a fifth embodiment of the present invention will be discussed. The fifth embodiment is substantially the same as the fourth embodiment, except for the construction of the inputted packet processor, and therefore the discussion will be focused on the inputted packet processor.

The input processing unit 19 in the fourth embodiment, if the failure occur in the link (e.g., link A) selected by static routing, transfers the packet 24 to the link (e.g., link B) selected by dynamic routing.

The transferred packet 24 is off the route (virtual circuit) based on label switching. If it is assumed herein that the inputted packet processor of the communication device receiving the transferred packet 24 has the same construction as that of the inputted packet processor 24, the label 24a in the packet 24 is inputted to the static routing table 20.

The static routing table 20 does not, however, retain a piece of next hop information corresponding to the label 24a, and is therefore incapable of forwarding the packet 24. Accordingly, when the packet 24 is forwarded to the route (link) selected by dynamic routing, the inputted packet processor, which is to receive the packet 24, must forward the packet 24 to the route selected by dynamic routing. The discussion on the fifth embodiment is an inputted packet processor 25 capable of troubleshooting the above problem.

Figure 5:
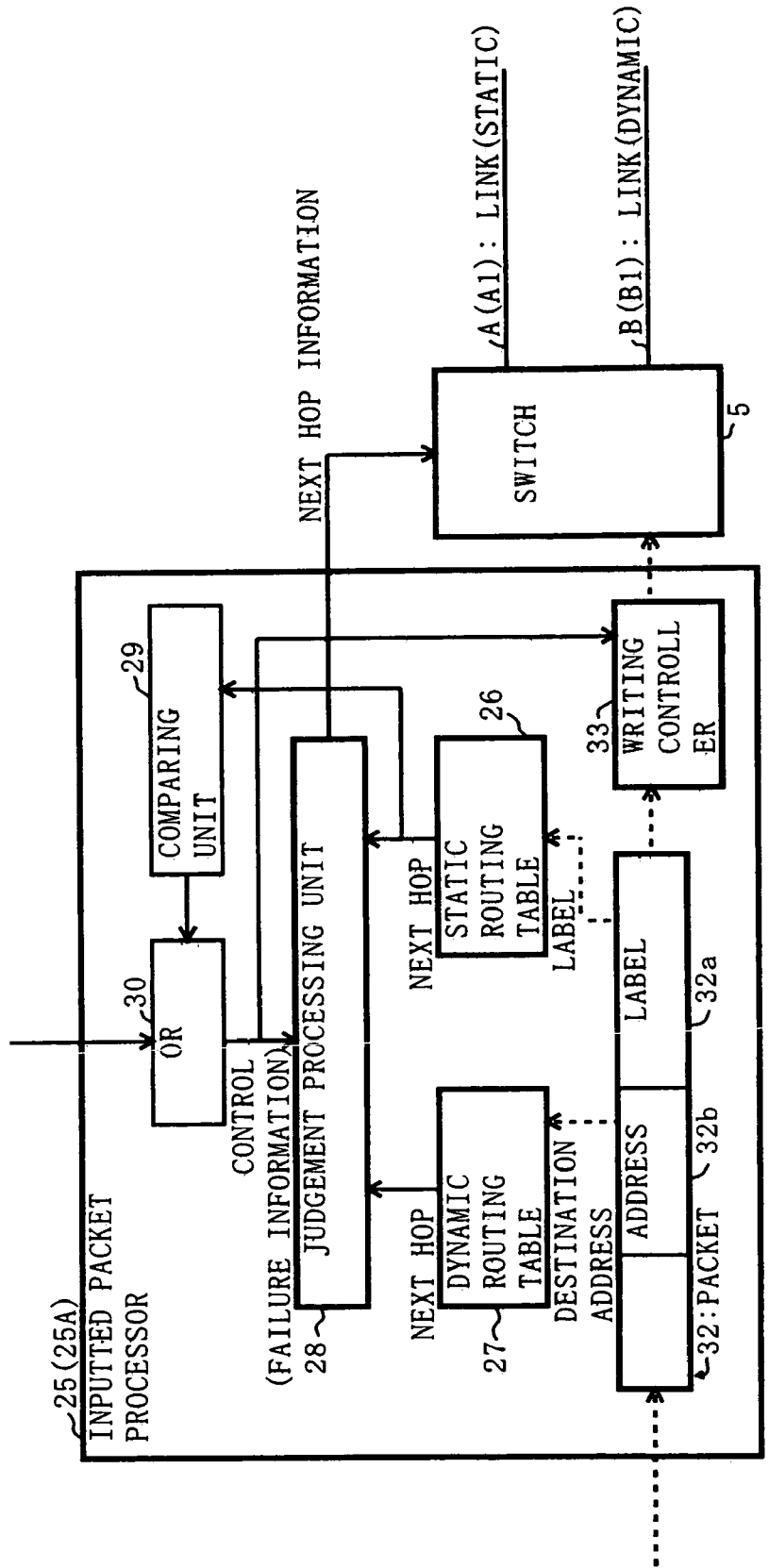
FIG. 5 is a diagram showing construction of the inputted packet processor in a fifth embodiment.

FIG. 5 is a diagram showing construction of the inputted packet processor 25 provided in the communication device in the fifth embodiment. The inputted packet processor 25 includes a static routing table 26, a dynamic routing table 27 and a judgement control unit 28 which correspond to the components of the inputted packet processor 19, and, in addition to these components, further includes a comparing unit 29, an OR circuit 30 and write processing unit (corresponding to a write unit) 33.

The inputted packet processor 25 receives the packet 24 explained in the fourth embodiment or a packet 32. The packet 32, unlike the packet 24, has one label 32a and a destination address 32b as the destination information.

The static routing table 26, when the label 32a is inputted, functions to input next hop information corresponding to the label 32a to the judgement processing unit 28 and the comparing unit 29. At this time, the static routing table 26, if a value of the label 32a takes a predetermined special value (corresponding to special data), inputs the inputted special value instead of the next hop information to the judgement processing unit 28 and the comparing unit 29. The special value is set to the predetermined value such as "0" etc.

The comparing unit 29 compares the next hop information or the special value inputted from the static routing table 26 with a special value stored in the comparing unit 29 itself. If these two values are coincident with each other (in such a case that the special value is inputted from the static routing table 26), The comparing unit 29 inputs this special value to the OR circuit 30.

The failure information about the link A or a control signal of the operator and the special value given from the comparing unit 29, are inputted to the OR circuit 30. The OR circuit 30, when the failure information or the control signal is inputted, when the special value is inputted, or when both of them are simultaneously inputted, inputs the special value as an output signal to the judgement control unit 28 and the write processing unit 33.

When the special value is inputted from the OR circuit 30, the judgement processing unit 28 judges that the failure occur in the link A or the packet 32 (packet 24) is forwarded off the label switching route, and selects and supplies the next hop information received from the dynamic routing table 27 to the switch 5.

The write processing unit 33, to which the packet 32 (packet 24) is inputted, receives the special value from the OR circuit 30. The write processing unit 33, when receiving the special value, rewrites a value of the label 32a of the packet 32 into a special value, and thereafter inputs packet 32 to the switch 32.

As a matter of course, however, if the special value has already been written to the label 32a of the inputted packet 32, the process may be not that the write processing unit 33 executes the writing process described above, but that the packet 32 is inputted to the switch 5. The dynamic routing table 27 has the same function as what has been described in the fourth embodiment, and hence its explanation is omitted.

According to the inputted packet processor 25 described above, if the failure occur in the link A selected by static routing, the switch 5 is supplied with the next hop information outputted from the dynamic routing table 27, and the packet of which the label 32a is rewritten into the special value by the write processing unit 33, is inputted to the switch 5. The switch 5 forwards the packet 32 having the special value to the link B.

The communication device including an inputted packet processor 25A having the same construction as the inputted packet processor 25 receives the packet 32 having the special value via the link B, in which case, even if the failure does not occur in a link (e.g., link A1) selected by the static routing table of this inputted packet processor 25A, the judgement processing unit 28 supplies the switch 5 with the next hop information outputted from the dynamic routing table 27. The packet 32 is thereby forwarded from the switch 5 to the link (e.g., link B1) selected by dynamic routing.

Thus, if the packet 32 is forwarded off the label switching route, the label 32a is rewritten into the special value, and the packet 32 having the special value is received by the communication device including the inputted packet processor 25A. Namely, an inbound notification of the special value is given to the communication having the inputted packet processor 25A.

The communication device having the inputted packet processor 25A forwards the packet 32 to the link B selected by dynamic routing. Accordingly, even if the packet 32 is off the label switching route, the reachability of the packet 32 to the end point is secured.

Note that the communication device having the inputted packet processor 25A may be connected to the communication device having the inputted packet processor 19 via the link (B) selected by dynamic routing.

FIG. 30 is a diagram showing an example of the network system to which the communication device in the fifth embodiment is applied, wherein there is given an example of switching to the dynamic route against an occurrence of the failure. Referring to FIG. 30, the plurality of routers R11–R15 as the communication devices each including an inputted packet processor 25 are connected to each other via the communication lines, thereby configuring the network. The host X is connected to the router R11, and the host Y is connected to the router R15.

Contents of the static routing table 26 and of the dynamic routing table 27 held in each of the routers R11–R15 are substantially the same as those shown in FIG. 27, except for such a point that the dynamic routing table 27 of the router R11 retains information on a link #b as a piece of next hop information corresponding to the host Y.

If a failure occur in a link #d for the duration of forwarding the packet 32 from the host X to the host Y, the router R13, when receiving the packet 32 from the router R12, judges that the failure occur in the link #d defined as a static route. Then, a value of the label 32a of the packet 32 is rewritten into a special value, and the packet 32 is transmitted to the router R12 in accordance with the information about the link #b corresponding to the host Y, which is stored in the dynamic routing table 27.

When the router 12 receives the packet 32, because of the value of the label 32a of the packet 32 being the special value, the packet 32 is transmitted via a link #c to the router R15 on the basis of the next hop information corresponding to the host Y that is stored in the dynamic routing table 27. Note that the write processing unit 33 in the router R12 does not change (through) the special value, or rewrites it into the same special value or into other special value.

The router R15, when receiving the packet 32 from the router R12, based on the special value written in the label 32a, forwards the packet 32 to the host Y via a link #e in accordance with the next hop information corresponding to the host Y that is stored in the dynamic routing table 27.

Sixth Embodiment

Next, the communication device in a sixth embodiment of the present invention will be explained. The sixth embodiment is substantially the same as the first embodiment, except for the construction of the inputted packet processor, and therefore the discussion will be focused on the inputted packet processor.

Figure 6:
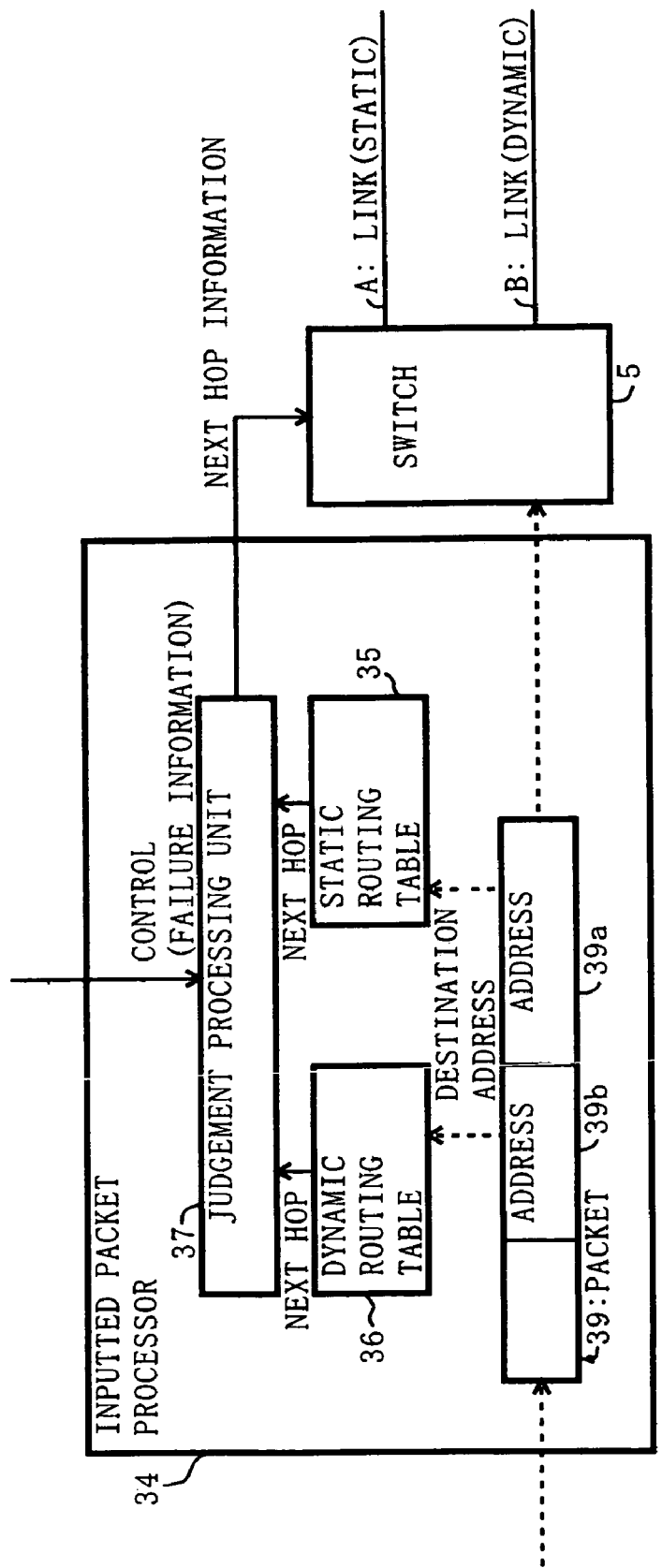
FIG. 6 is a diagram showing construction of the inputted packet processor in a sixth embodiment.

FIG. 6 is a diagram showing construction of an input processing unit 34 provided in the communication device in the sixth embodiment. The inputted packet processor 34 receives the packet 39 received by the communication device. The packet 39 contains a destination address 39a as a first search key, and a destination address 39b as a second search key.

The destination addresses 39a and 39b have the same data structure, but are global and unique addresses having values different from each other. The destination address 39a is inputted to the static routing table 35, and the destination address 39b is inputted to the dynamic routing table 36.

The configurations and functions of the static routing table 35, the dynamic routing table 36, the judgement processing unit 37 and the switch 5, are the same as those in the first embodiment, and hence the repetitive explanations are omitted. According to the sixth embodiment, the routing tables 35 and 36 are searched inside by use of pieces of information, (the addresses 39a, 39b) having the same data structure but different from each other, of the packet 39.

Seventh Embodiment

Next, the communication device in a seventh embodiment of the present invention will be explained. The seventh embodiment is substantially the same as the second embodiment, except for the construction of the inputted packet processor, and therefore the discussion will be focused on the inputted packet processor.

Figure 7:
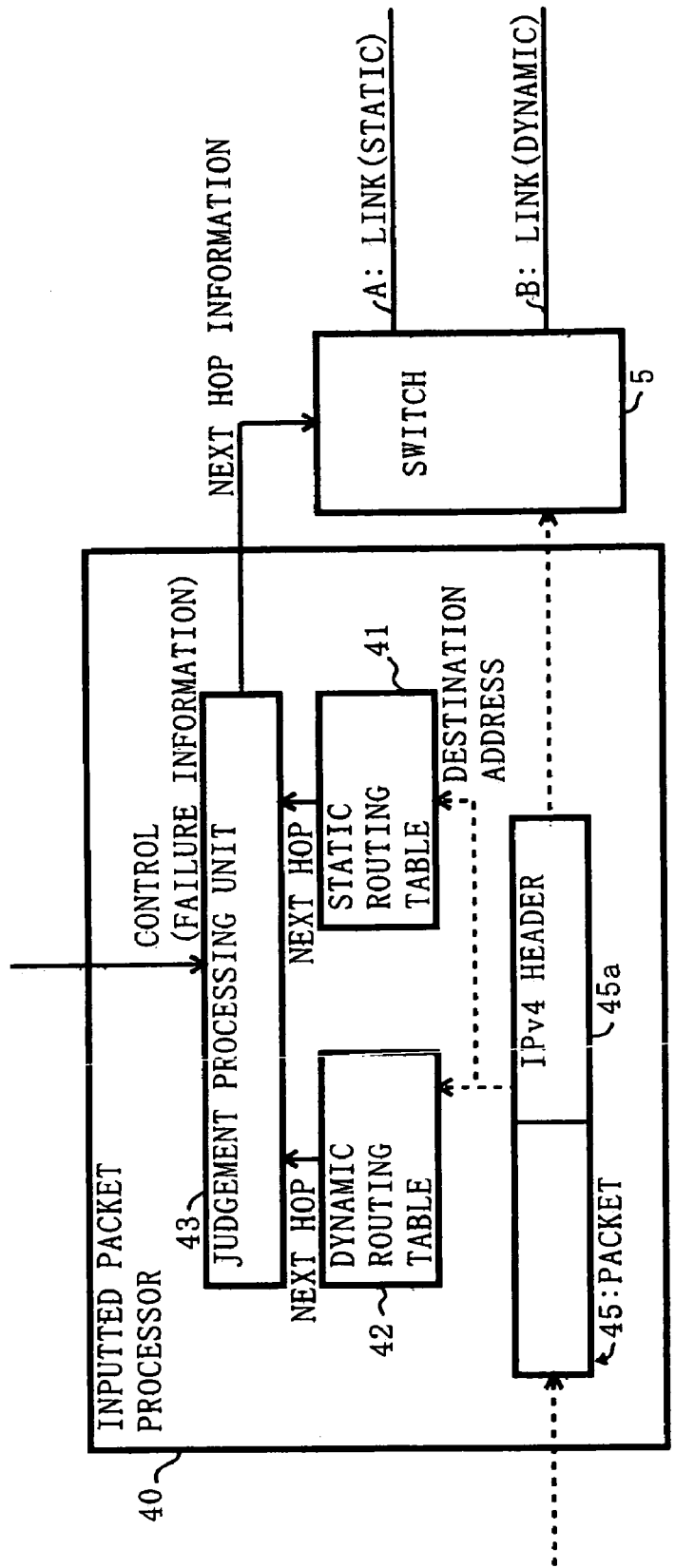
FIG. 7 is a diagram showing construction of the inputted packet processor in a seventh embodiment.

FIG. 7 is a diagram showing construction of an input processing unit 40 provided in the communication device in the seventh embodiment. The inputted packet processor 40 receives an IP packet 45 received by the line interface unit Z. The IP packet 45 is defined as an IP packet (IP datagram) in Version 4, and contains an IPv4 header 45a.

Figure 8:
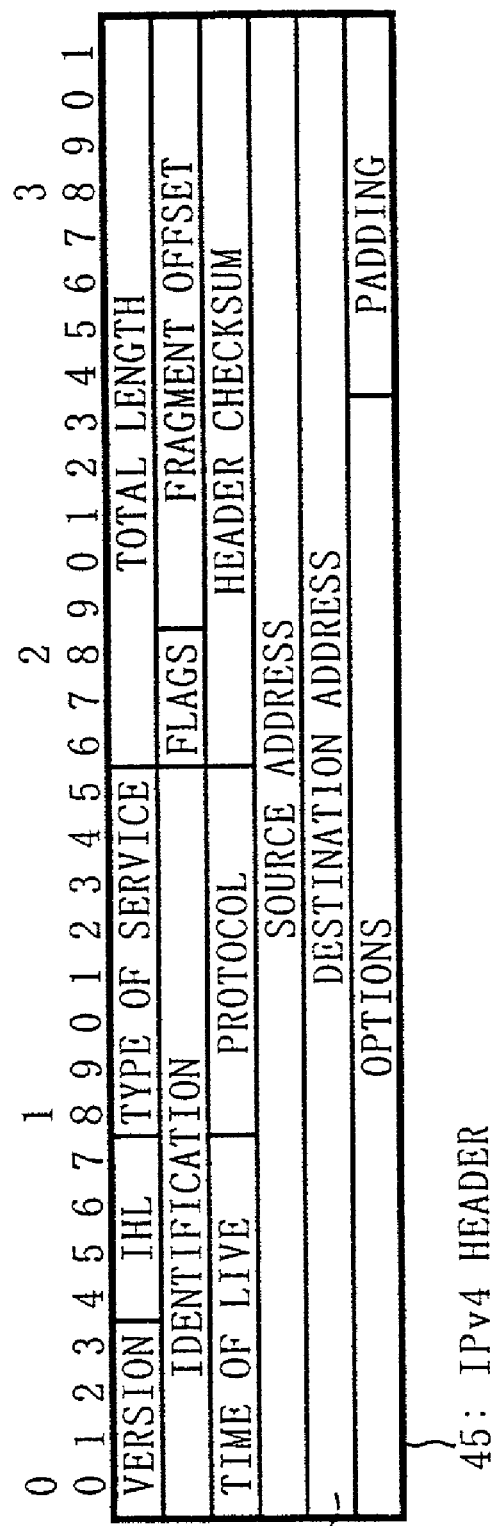
FIG. 8 is an explanatory diagram showing a format of an IPv4 header.

FIG. 8 is an explanatory diagram showing a format of the IPv4 header 45a. The IPv4 header 45a contains a destination address 46 of the IP packet 45. This destination address 46 corresponds to the destination address 12a in the second embodiment.

The destination address 46 is, when the IP packet 45 is received by the inputted packet processor 40, inputted to a static routing table 41 and a dynamic routing table 42 as a search key common to these routing tables 41, 42.

Other than the points explained above, the construction and functions in the seventh embodiment are substantially the same as those in the second embodiment, of which the repetitive explanations are therefore omitted. Substantially the same effects as those in the second embodiment can be obtained in the seventh embodiment.

Eighth Embodiment

Next, the communication device in an eighth embodiment of the present invention will be explained. The eighth embodiment is substantially the same as the second embodiment, except for the construction of the inputted packet processor, and therefore the discussion will be focused on the inputted packet processor.

Figure 9:
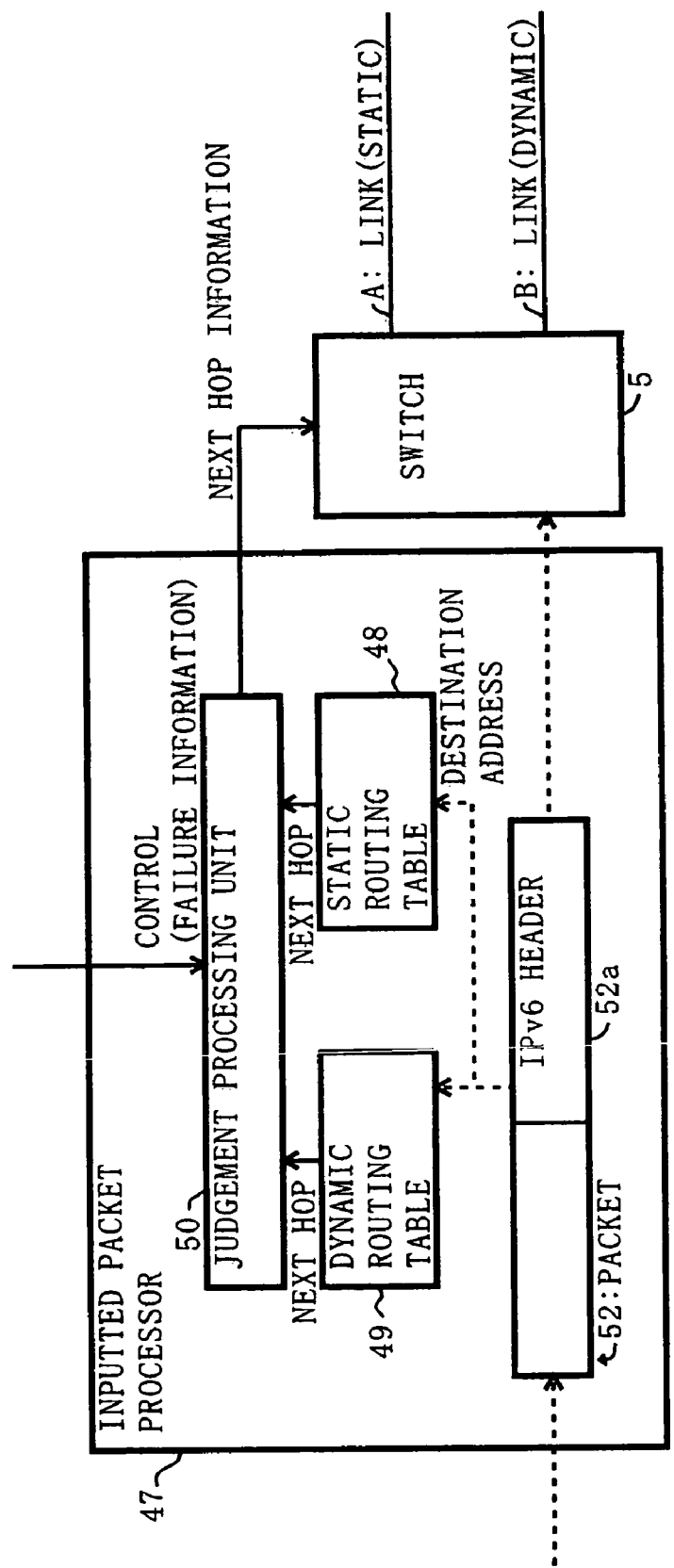
FIG. 9 is a diagram showing construction of the inputted packet processor in an eighth embodiment.

FIG. 9 is a diagram showing construction of an input processing unit 47 provided in the communication device in the eighth embodiment. The communication device in the eighth embodiment receives an IP packet 52. The IP packet 52 is defined as an IP packet (IP datagram) in Version 6, and contains an IPv6 header 52a.

Figure 10:
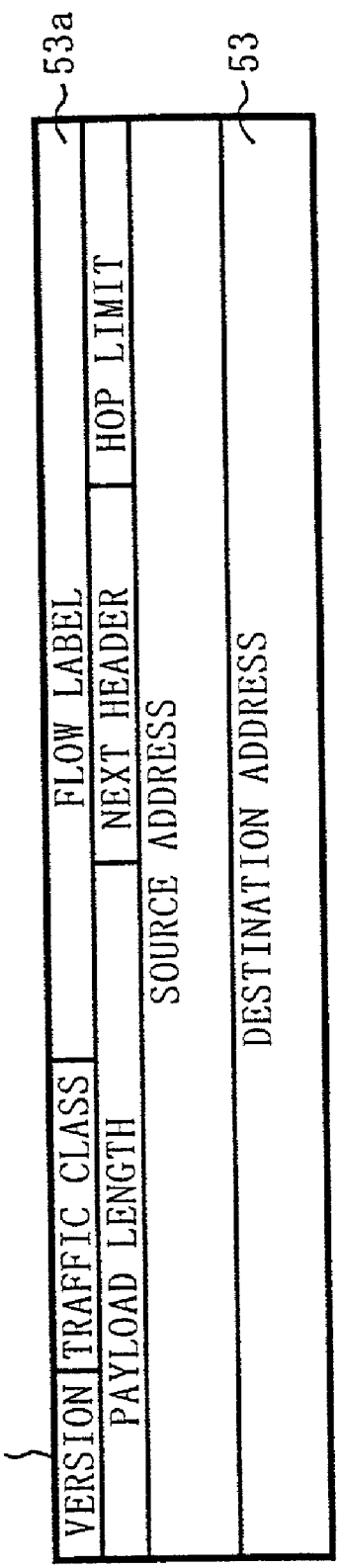
FIG. 10 is an explanatory diagram showing a format of an IPv6 header.

FIG. 10 is an explanatory diagram showing a format of the IPv6 header 52a. The IPv6 header 52a contains a destination address 53 as a piece of destination information of the IP packet 52. The destination address 53 corresponds to the destination address 12a in the second embodiment.

The destination address 53 is, when the IP packet 52 is received by the inputted packet processor 47, inputted to a static routing table 48 and a dynamic routing table 49 as a search key common to these routing tables 48, 49.

Other than the points explained above, the construction and functions in the eighth embodiment are substantially the same as those in the second embodiment, of which the repetitive explanations are therefore omitted. Substantially the same effects as those in the second embodiment can be obtained in the eighth embodiment.

Ninth Embodiment

Next, the communication device in a ninth embodiment of the present invention will be explained. The ninth embodiment is substantially the same as the third embodiment, except for the construction of the inputted packet processor, and therefore the discussion will be focused on the inputted packet processor.

Figure 11:
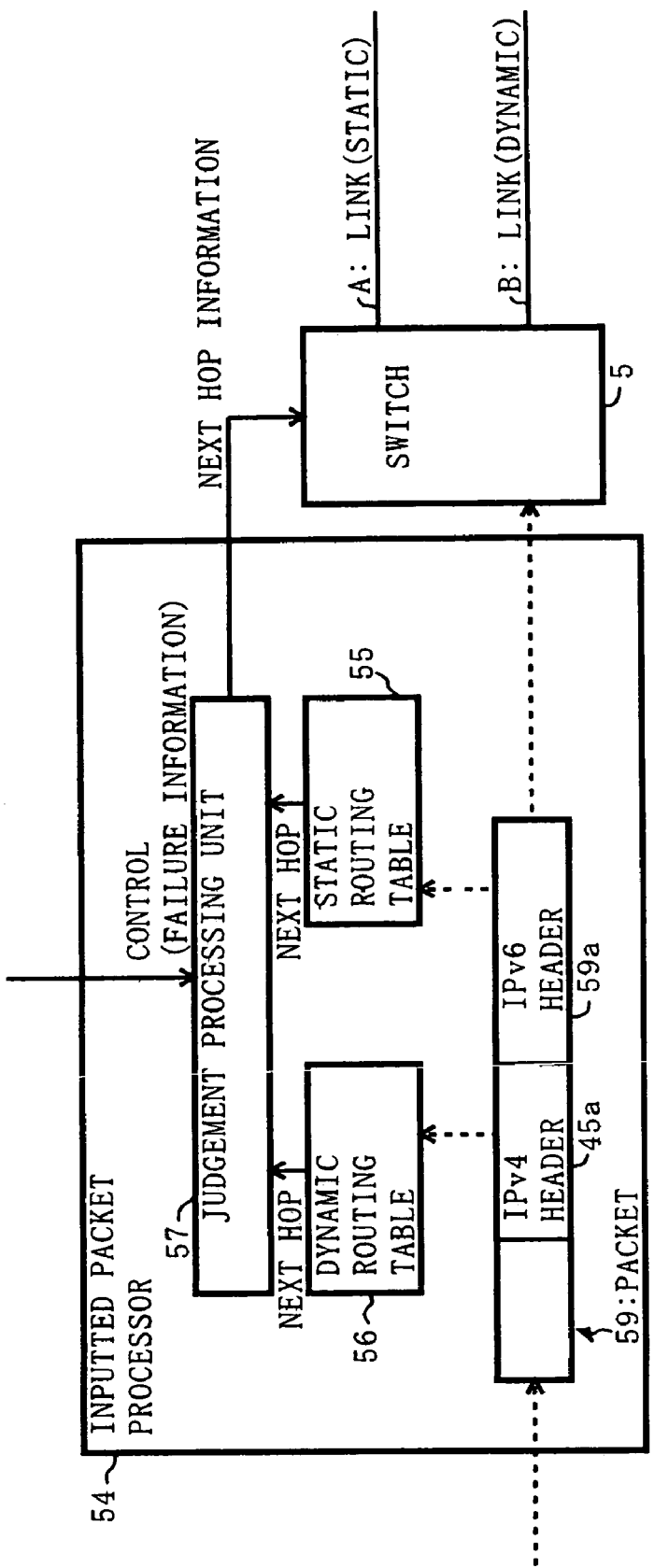
FIG. 11 is a diagram showing construction of the inputted packet processor in a ninth embodiment.

FIG. 11 is a diagram showing construction of an input processing unit 54 provided in the communication device in the ninth embodiment. The inputted packet processor 54 reflects the policy in the network by static routing that uses a mpls shim header (hereinafter simply referred to as a "shim" header) in MPLS (Multiple Protocol Label Switching).

An IP packet 59 received (inputted to the inputted packet processor 54) by the communication device in the ninth embodiment, contains a shim header 59a and an IPv4 header 45a (see FIG. 8).

Figure 12:
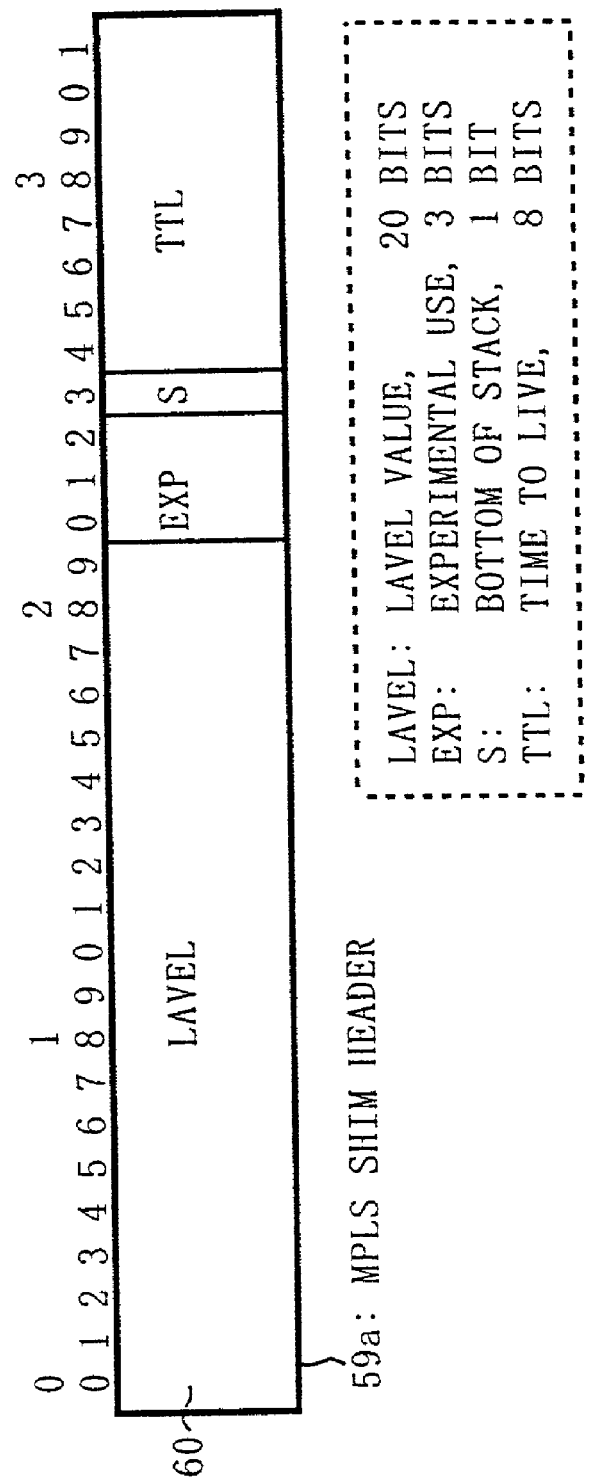
FIG. 12 is an explanatory diagram showing a format of a MPLS shim header.

FIG. 12 is an explanatory diagram showing a format of the shim header 59a. The shim header is recommended in ""MPLS Label Stack Encoding", draft-ietf-mpls-label-encaps-07.txt" of Internet Draft.

The shim header 59a is stored with a label value (corresponding to virtual circuit information) 60 as a piece of destination information, which may be defined as identification information of a label switching route. The label value 60 corresponds to the virtual circuit number 18b in the third embodiment.

When the IP packet 59 is received by the inputted packet processor 54, the label value 60 in the shim header 59a of the IP packet 59 is inputted to the static routing table 55. On the other hand, the destination address 46 in the IPv4 header 45a of the IP packet 59 is inputted to the dynamic routing table 56. The destination address 46 corresponds to the destination address 18a in the third embodiment.

Other than the points explained above, the construction and functions in the ninth embodiment are substantially the same as those in the third embodiment, of which the repetitive explanations are therefore omitted. Substantially the same effects as those in the third embodiment can be obtained in the ninth embodiment.

Tenth Embodiment

Next, the communication device in a tenth embodiment of the present invention will be explained. The tenth embodiment is substantially the same as the fourth embodiment, except for the construction of the inputted packet processor, and therefore the discussion will be focused on the inputted packet processor.

Figure 13:
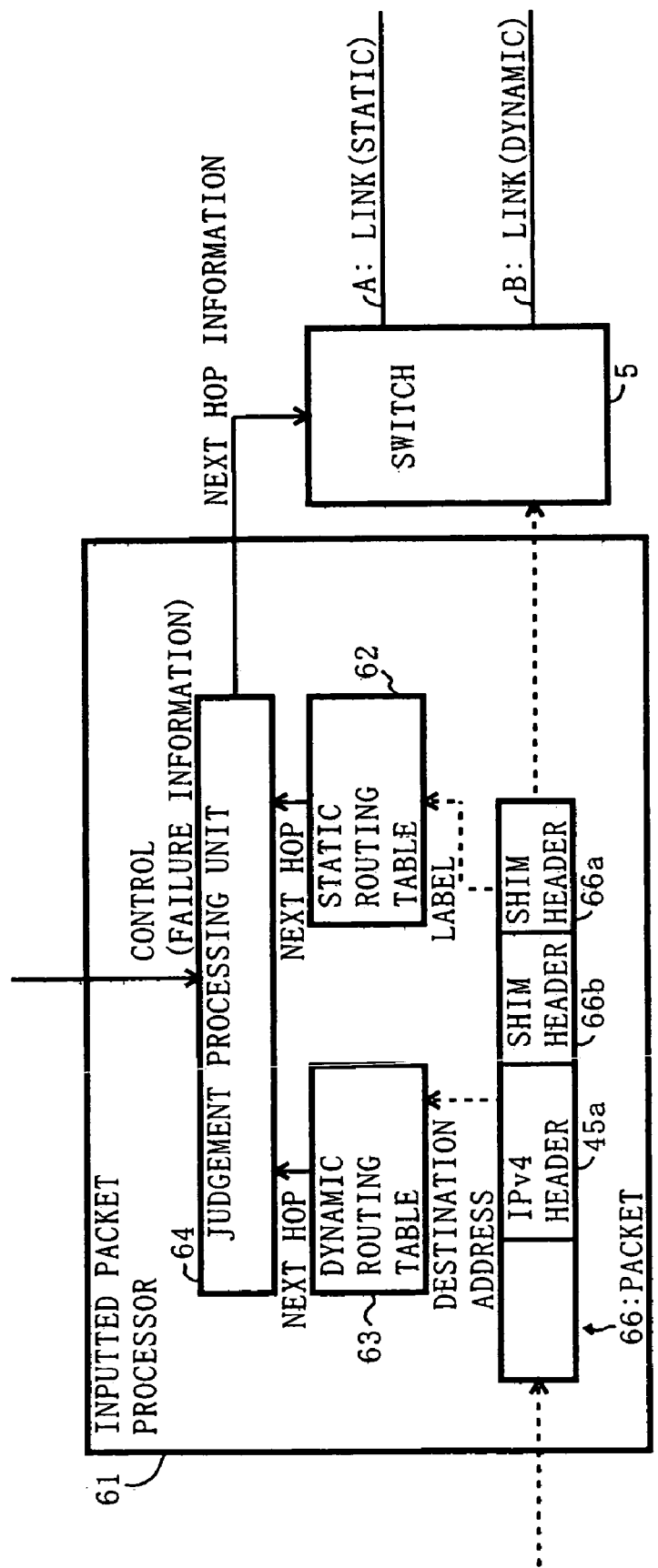
FIG. 13 is a diagram showing construction of the inputted packet processor in a tenth embodiment.

FIG. 13 is a diagram showing construction of an input processing unit 61 provided in the communication device in the tenth embodiment. An inputted packet processor 61 reflects the policy in the network by MPLS-based static routing.

An IP packet 66 is inputted to the inputted packet processor 61. The IP packet 66 contains the shim headers 66a, 66b and the IPv4 header 45a (see FIG. 8). Each of the shim headers 66a, 66b is the same format as the shim header 59a shown in FIG. 12.

The destination address 46 stored in the IPv4 header 45a corresponds to the destination address 24c in the fourth embodiment, and the label value 60 of the shim header 66a corresponds to the label 24a in the fourth embodiment.

When the IP packet 66 is received by the inputted packet processor 61, the label value 60 of the shim header 66a stored in a front-side field of the IP packet 66 is inputted to the static routing table 62. On the other hand, the destination address 46 in the IPv4 header 45a of the IP packet 66 is inputted to the dynamic routing table 63.

Other than the points explained above, the construction and functions in the tenth embodiment are substantially the same as those in the fourth embodiment, of which the repetitive explanations are therefore omitted. Substantially the same effects as those in the fourth embodiment can be obtained in the tenth embodiment.

Eleventh Embodiment

Next, the communication device in an eleventh embodiment of the present invention will be described. The eleventh embodiment has the points common to the third and ninth embodiments. Therefore, the discussion will be focused on only different points.

Figure 14:
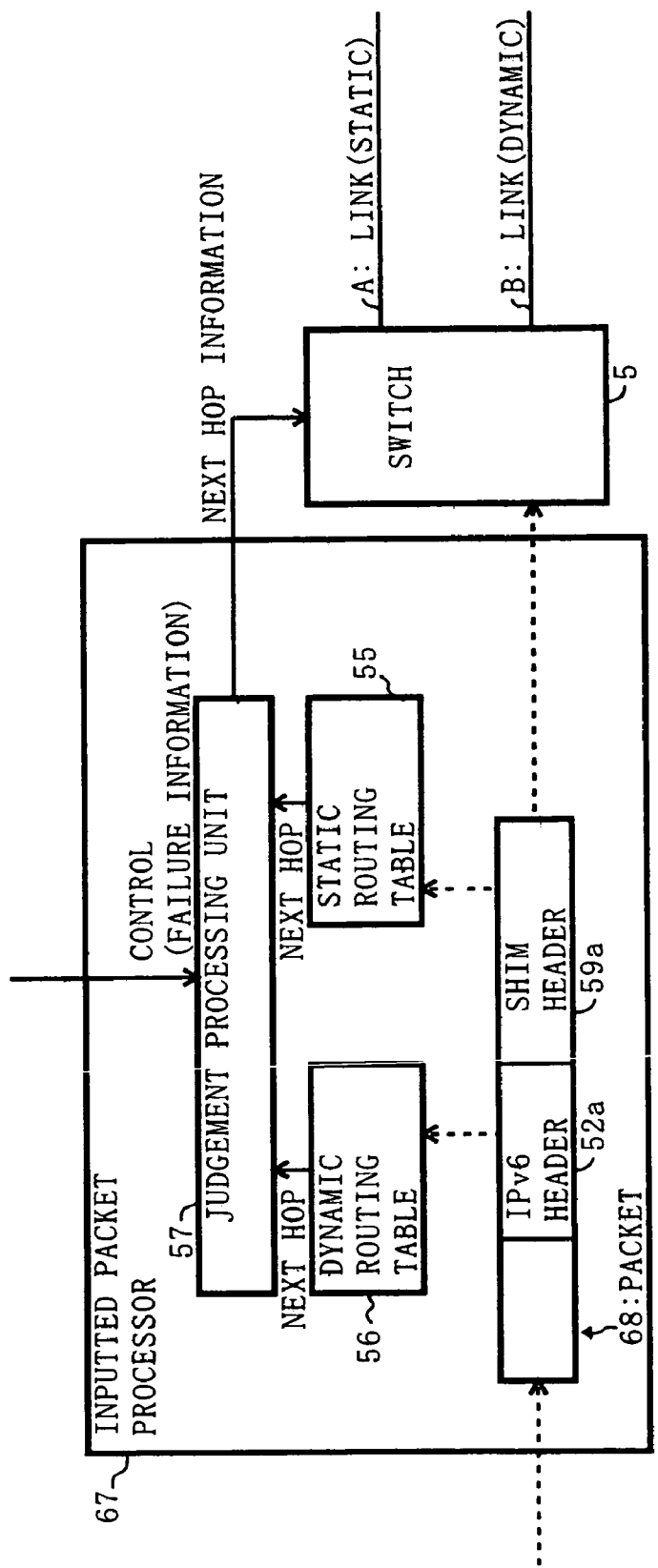
FIG. 14 is a diagram showing construction of the inputted packet processor in an eleventh embodiment.

FIG. 14 is a diagram showing construction of an inputted packet processor 67 in the eleventh embodiment. The inputted packet processor 67 receives an IP packet 68 containing an IPv6 header 52a in place of the IPv4 header 45a, and executes a routing process. The inputted packet processor 67 differs in terms of this point from the inputted packet processor 54 in the ninth embodiment.

The destination address 53 stored in the IPv6 header 52a stuck to the IP packet 68 corresponds to the destination address 18a in the third embodiment. The label value 60 in the shim header 59a of the IP packet 68 corresponds to the virtual circuit number 18b in the third embodiment.

Other configuration and functions of the inputted packet processor 67 are substantially the same as those in the ninth embodiment, of which the repetitive explanations are therefore omitted. Substantially the same effects as those in the third embodiment can be obtained in the eleventh embodiment.

Twelfth Embodiment

Next, the communication device in a twelfth embodiment of the present invention will be described. The twelfth embodiment has the points common to the fourth and tenth embodiments. Therefore, the discussion will be focused on only different points.

Figure 15:
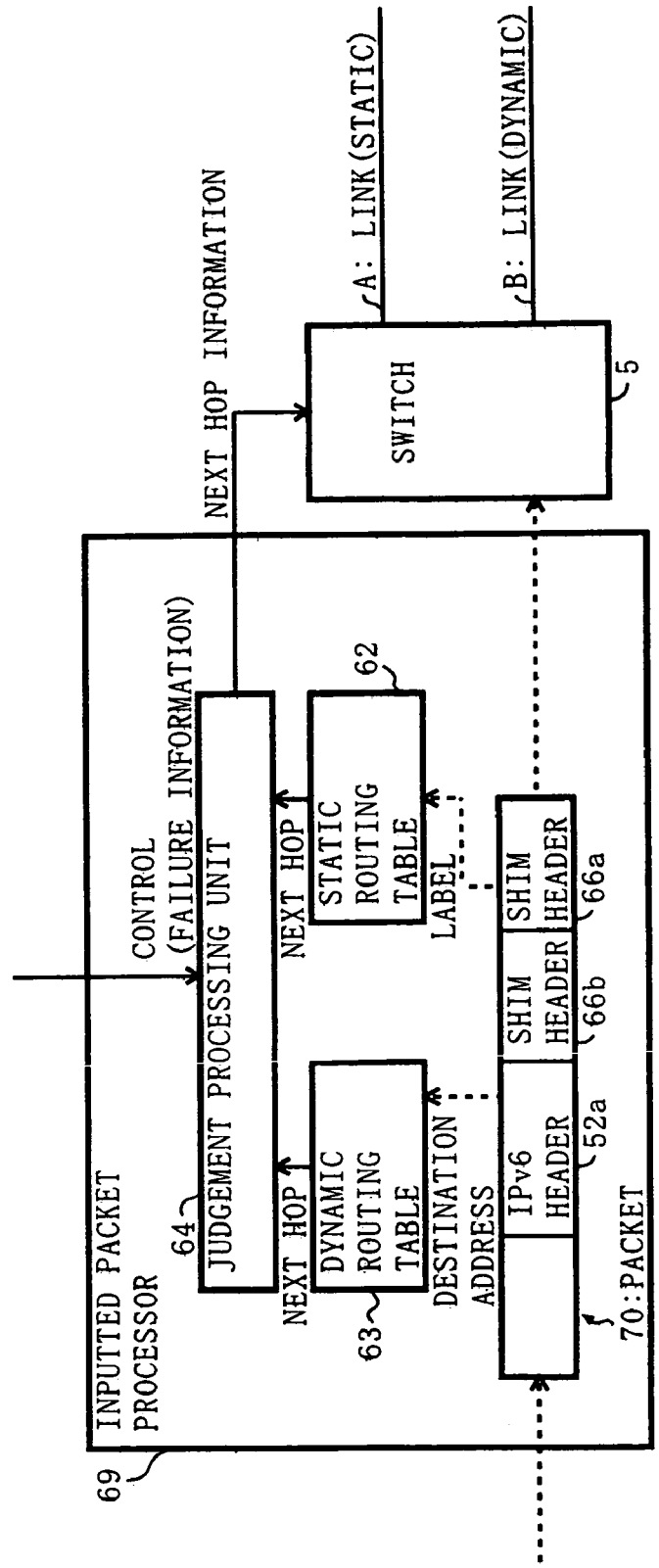
FIG. 15 is a diagram showing construction of the inputted packet processor in a twelfth embodiment.

FIG. 15 is a diagram showing construction of an inputted packet processor 69 provided in the communication device in the twelfth embodiment. The inputted packet processor 69 receives an IP packet 70 containing the IPv6 header 52a as a substitute for the IPv4 header 45a, and executes routing. The inputted packet processor 69 differs in terms of this point from the inputted packet processor 61 in the tenth embodiment.

The destination address 53 stored in the IPv6 header 52a stuck to the IP packet 70 corresponds to the destination address 24c in the fourth embodiment, and the label value 60 in a shim header 66a of the IP packet 70 corresponds to the label in the fourth embodiment.

Other configuration and functions of the inputted packet processor 69 are substantially the same as those in the tenth embodiment, of which the repetitive explanations are therefore omitted. Substantially the same effects as those in the fourth embodiment can be obtained in the twelfth embodiment.

Thirteenth Embodiment

Next, the communication device in a thirteenth embodiment of the present invention will be described. The thirteenth embodiment has the points common to the third and ninth embodiments. Therefore, the discussion will be focused on different points.

Figure 16:
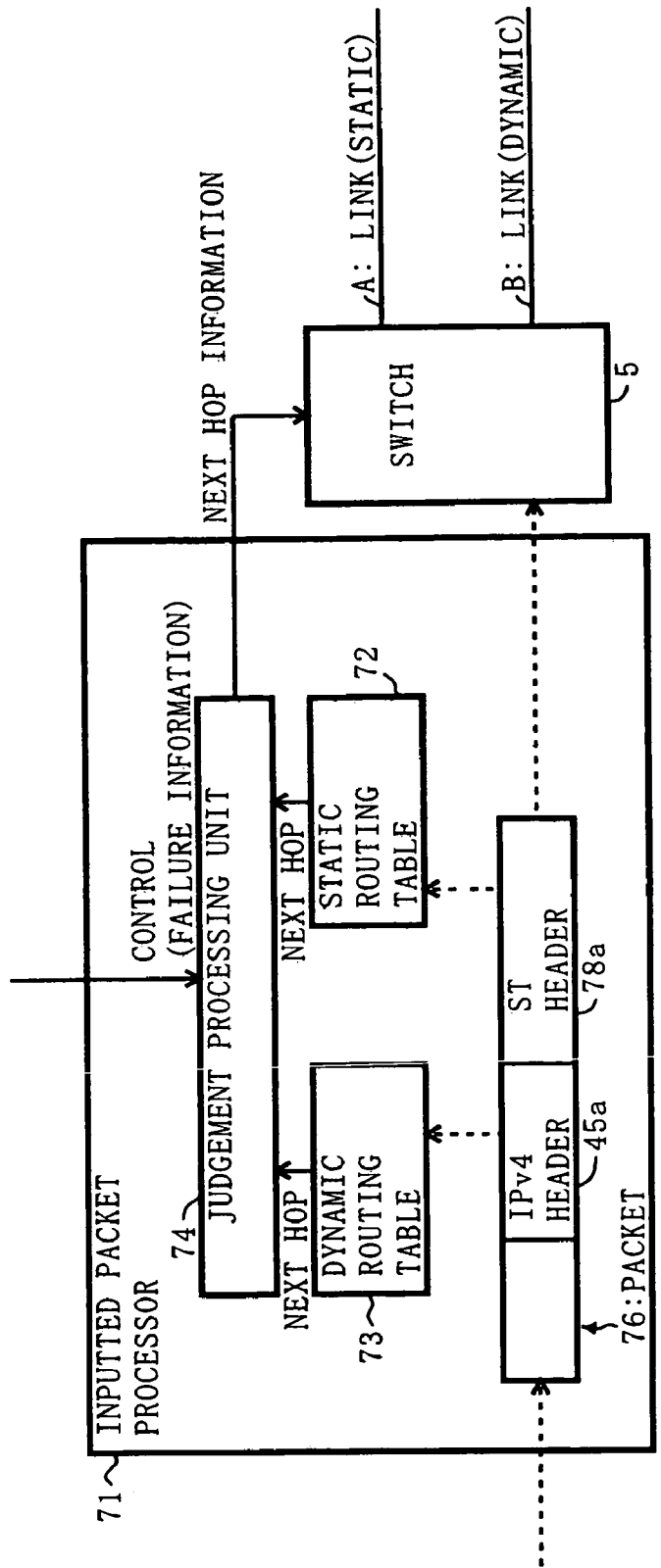
FIG. 16 is a diagram showing construction of the inputted packet processor in a thirteenth embodiment.

FIG. 16 is a diagram showing construction of an inputted packet processor 71 in the thirteenth embodiment. The inputted packet processor 71 reflects the policy in the network by static routing that uses an ST2 header in Internet Stream Protocol Version 2 (which will hereinafter abbreviated to "ST2" as a virtual circuit.

The communication device in the thirteenth embodiment receives an IP packet 76. The IP packet 76 is inputted to the inputted packet processor 71. An ST2 header 76a and the IPv4 header 45a (see FIG. 8) are stuck to the IP packet 76.

Figure 17:
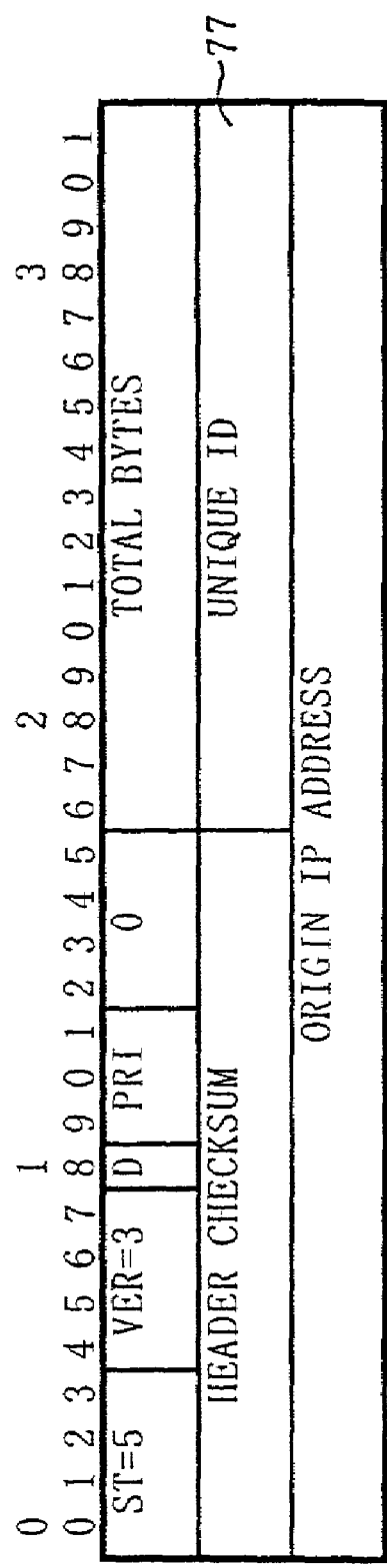
FIG. 17 is an explanatory diagram showing a format of an ST (ST2) header.

FIG. 17 is an explanatory diagram showing a format of the ST2 header 76a. The ST2 header 76a is stored with a uniqueID 77 as a piece of identification information (virtual circuit information) of a route serving as the virtual circuit.

Note that the ST2 header is recommended in "RFC1819 E Aug 95 Internet Stream Protocol Version 2 (ST2) Protocol Specification—Version ST2+".

The destination address 46 in the IPv4 header 45a stuck to the IP packet 76 corresponds to the destination address 18a in the third embodiment, and the uniqueID 77 in the ST2 header 76a corresponds to the virtual circuit number 18b in the third embodiment.

When the IP packet 76 is inputted to the inputted packet processor 71, the uniqueID 77 in the IP packet 76 is inputted to the static routing table 72. On the other hand, the destination address 46 in the IP packet 76 is inputted to the dynamic routing table 56.

Other than the points explained above, the construction and functions in the thirteenth embodiment are substantially the same as those in the ninth embodiment, of which the repetitive explanations are therefore omitted. Substantially the same effects as those in the third embodiment can be obtained in the thirteenth embodiment.

Fourteenth Embodiment

Next, the communication device in a fourteenth embodiment of the present invention will be described. The fourteenth embodiment has the points common to the third and thirteenth embodiments. Therefore, the discussion will be focused on different points.

Figure 18:
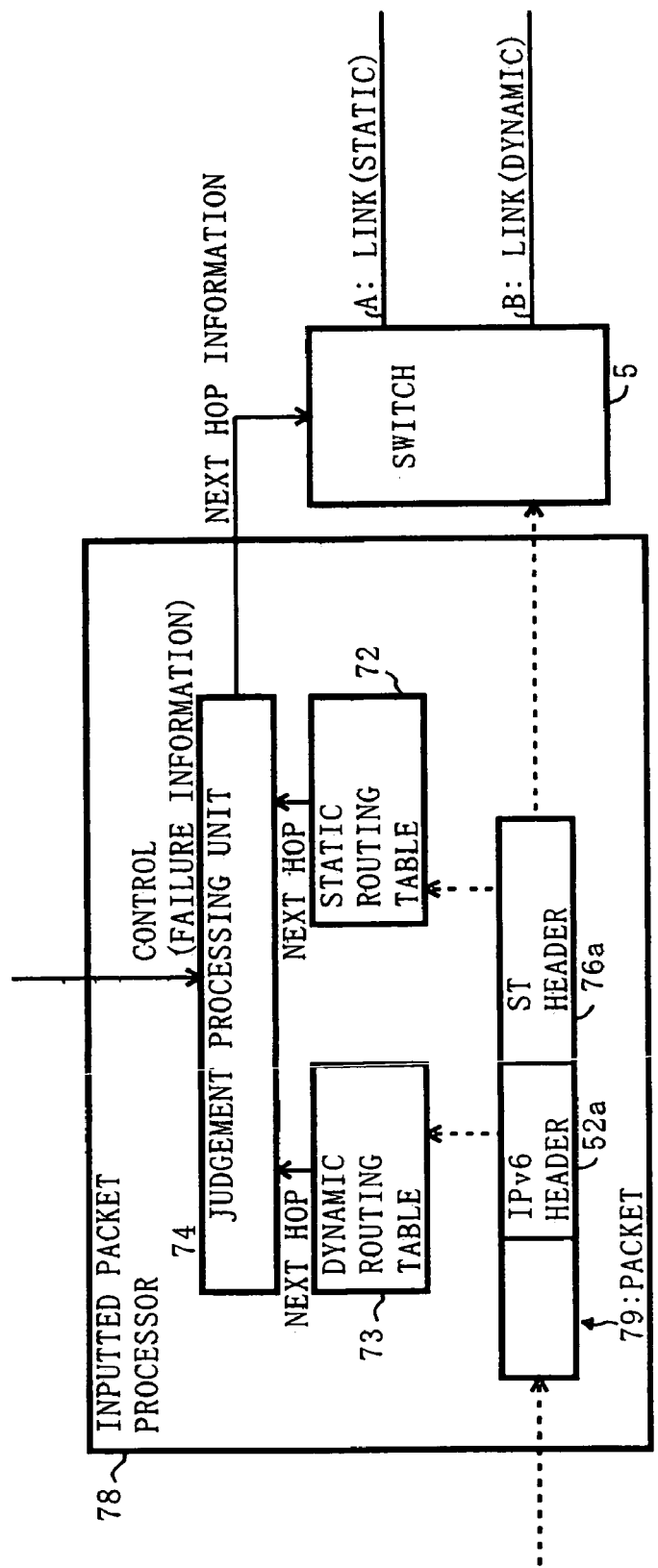
FIG. 18 is a diagram showing construction of the inputted packet processor in a fourteenth embodiment.

FIG. 18 is a diagram showing construction of an inputted packet processor 78 provided in the communication device in the fourteenth embodiment. The inputted packet processor 78 receives an IP packet 79 containing the IPv6 header 52a as a substitute for the IPv4 header 45a, and executes routing. The inputted packet processor 78 differs in this point from the inputted packet processor 71 in the thirteenth embodiment.

The destination address 53 in the IPv6 header 52a stuck to the IP packet 79 corresponds to the destination address 18a in the third embodiment, and the uniqueID 77 in the ST2 header 76a corresponds to the virtual circuit number 18b in the third embodiment.

Other configuration and functions of the inputted packet processor 78 are substantially the same as those of the inputted packet processor 71 in the third embodiment, of which the repetitive explanations are therefore omitted. Substantially the same effects as those in the third embodiment can be obtained in the fourteenth embodiment.

Fifteenth Embodiment

Next, the communication device in a fifteenth embodiment of the present invention will be described. The fifteenth is substantially the same as the sixth embodiment, excluding the construction of the inputted packet processor. Therefore, the discussion will be focused on the inputted packet processor.

Figure 19:
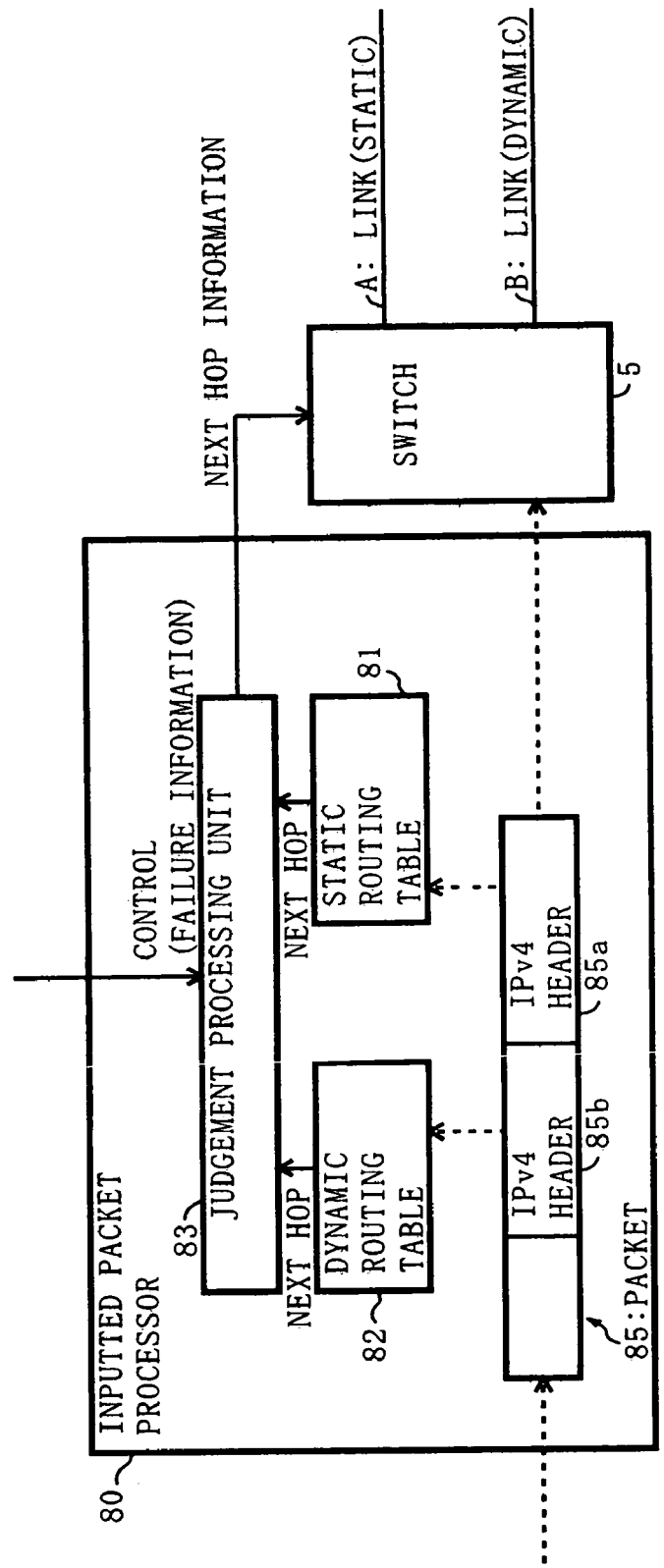
FIG. 19 is a diagram showing construction of the inputted packet processor in a fifteenth embodiment.

FIG. 19 is a diagram showing construction of an inputted packet processor 80 provided in the communication device in the fifteenth embodiment. The inputted packet processor 80 receives an IP packet 85 received by the line interface unit Z.

The IP packet 85 is stuck with two IPv4 headers 85a, 85b. The IPv4 headers 85a, 85b are based on the same format as that of the IPv4 header 45a shown in FIG. 8.

The destination address in the IPv4 header 85a corresponds to the destination address 39a in the sixth embodiment, and the destination address in the IPv4 header 85b corresponds to the destination address 39b in the sixth embodiment.

When the inputted packet processor 80 receives the IP packet 85, the destination address in the IPv4 header 85a stuck to the front-side field of the IP packet 85 is inputted to a static routing table 81. Further, the destination address in the IPv4 header 85b stuck next to the IPv4 header 85a is inputted to a dynamic routing table 82.

Other than the points explained above, the construction and functions in the fifteenth embodiment are substantially the same as those in the sixth embodiment, of which the repetitive explanations are therefore omitted. Substantially the same effects as those in the sixth embodiment can be obtained in the fifteenth embodiment.

Sixteenth Embodiment

Next, the communication device in a sixteenth embodiment of the present invention will be described. The sixteenth embodiment is substantially the same as the sixth embodiment, excluding the construction of the inputted packet processor. Therefore, the discussion will be focused on the inputted packet processor.

Figure 20:
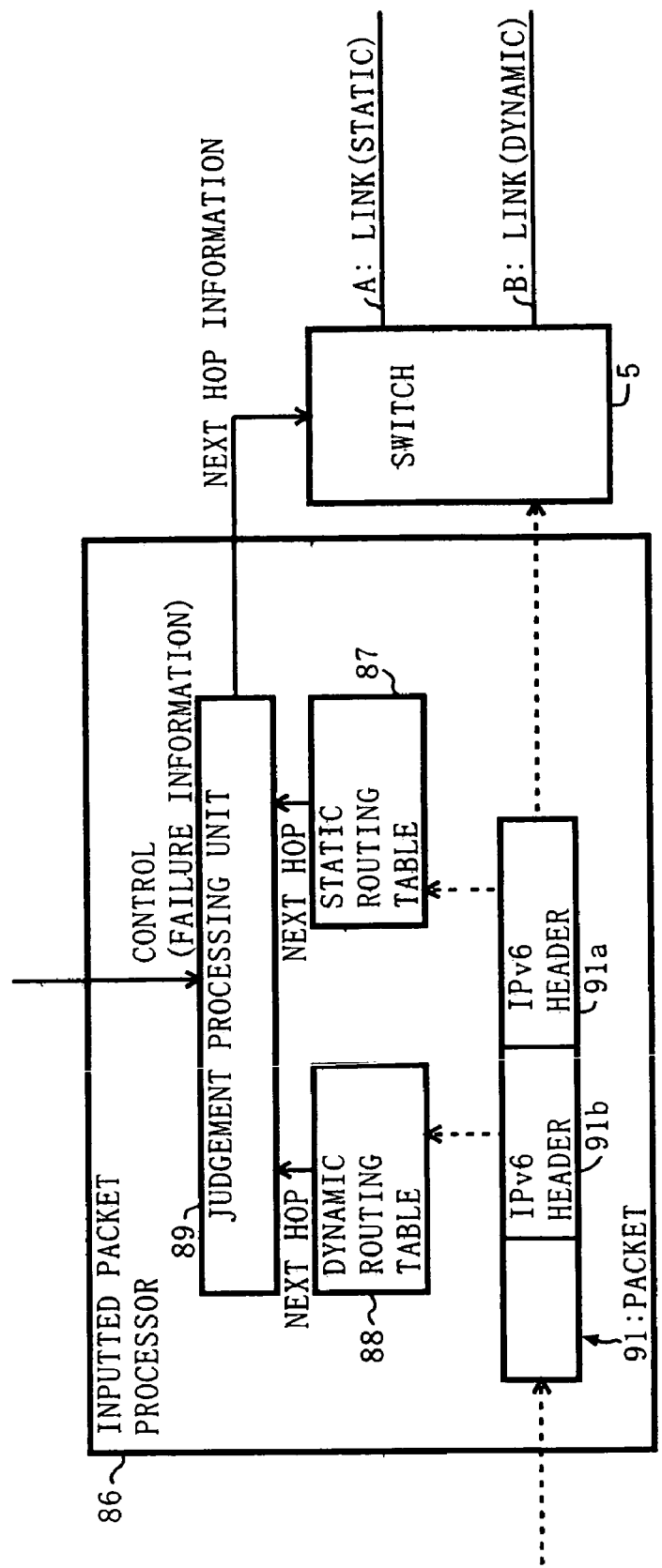
FIG. 20 is a diagram showing construction of the inputted packet processor in a sixteenth embodiment.

FIG. 20 is a diagram showing construction of an inputted packet processor 86 in the sixteenth embodiment.

An IP packet 91 received by the line interface unit Z is inputted to the inputted packet processor 86. The IP packet 91 is stuck with two IPv6 headers 91a, 91b. The IPv6 headers 91a, 91b are based on the same format as that of the IPv6 header 52a (see FIG. 10).

The destination address in the IPv6 header 91a corresponds to the destination address 39a in the sixth embodiment, and the destination address in the IPv6 header 91b corresponds to the destination address 39b in the sixth embodiment.

When the inputted packet processor 86 receives the IP packet 91, the destination address in the IPv6 header 91a stuck to the front-side field of the IP packet 91 is inputted to a static routing table 87. On the other hand, the destination address in the IPv6 header 91b stuck next to the IPv6 header 91a is inputted to a dynamic routing table 88.

Other than the points explained above, the construction and functions in the sixteenth embodiment are substantially the same as those in the sixth embodiment, of which the repetitive explanations are therefore omitted. Substantially the same effects as those in the sixth embodiment can be obtained in the sixteenth embodiment.

Seventeenth Embodiment

Next, the communication device in a seventeenth embodiment of the present invention will be described. The seventeenth embodiment is substantially the same as the sixth embodiment, excluding the construction of the inputted packet processor. Therefore, the discussion will be focused on the inputted packet processor.

Figure 21:
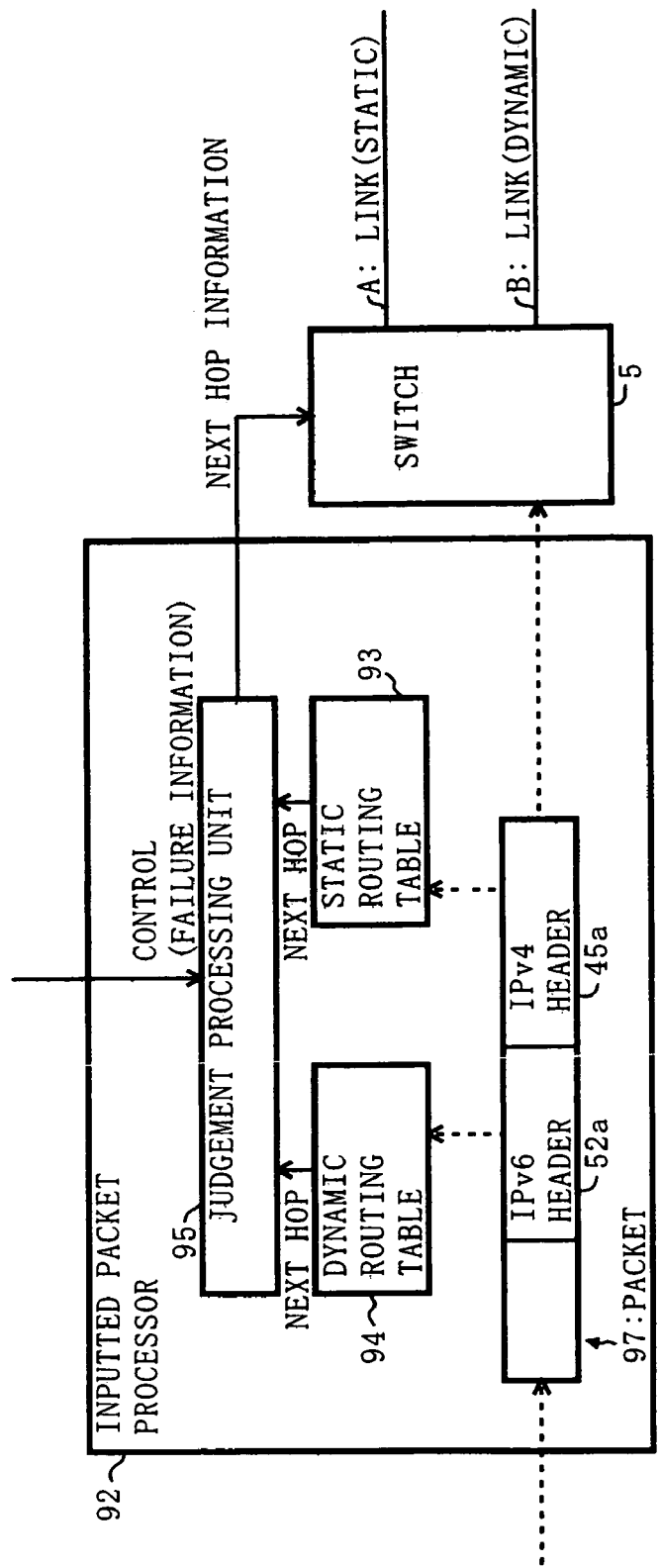
FIG. 21 is a diagram showing construction of the inputted packet processor in a seventeenth embodiment.

FIG. 21 is a diagram showing construction of an inputted packet processor 92 in the seventeenth embodiment.

An IP packet 97 received by the line interface unit Z is inputted to an inputted packet processor 92.

The IPv4 header 45a (see FIG. 8) is stuck to the front field of the IP packet 97, and the IPv6 header 52a (see FIG. 10) is stuck next to the IPv4 header 45a.

The destination address 46 in the IPv4 header 45a of the IP packet 97 corresponds to the destination address 39a in the sixth embodiment, and the destination address 53 in the IPv6 header 52a corresponds to the destination address 39b in the sixth embodiment.

When the inputted packet processor 92 receives the IP packet 97, the destination address 46 in the IPv4 header 45a is inputted to a static routing table 93. On the other hand, the destination address 53 in the IPv6 header 52a is inputted to a dynamic routing table 94.

Other than the points explained above, the construction and functions in the seventeenth embodiment are substantially the same as those in the sixth embodiment, of which the repetitive explanations are therefore omitted. Substantially the same effects as those in the sixth embodiment can be obtained in the seventeenth embodiment.

Eighteenth Embodiment

Next, the communication device in an eighteenth embodiment of the present invention will be described. The eighteenth embodiment is substantially the same as the sixth embodiment, excluding the construction of the inputted packet processor. Therefore, the discussion will be focused on the inputted packet processor.

Figure 22:
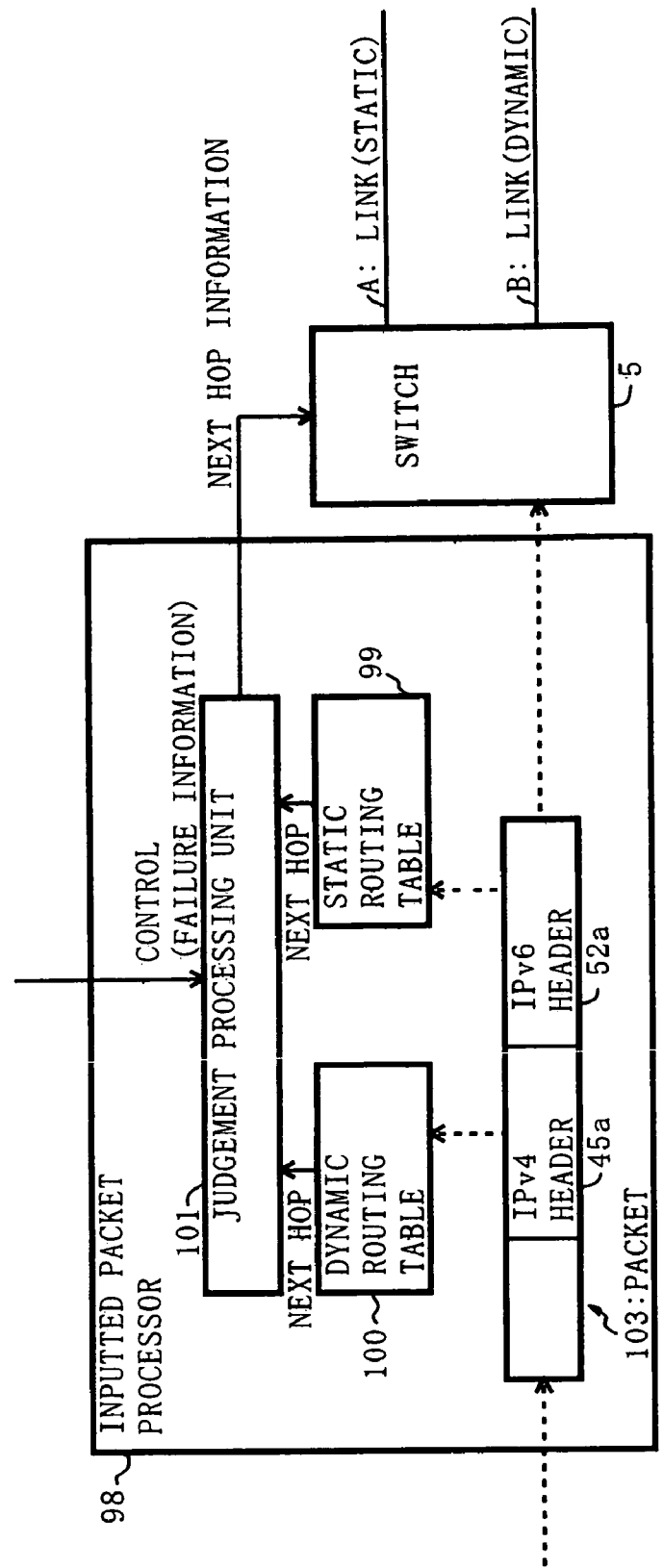
FIG. 22 is a diagram showing construction of the inputted packet processor in a eighteenth embodiment.

FIG. 22 is a diagram showing construction of an inputted packet processor 98 in the eighteenth embodiment. An IP packet 103 received by the line interface unit Z is inputted to the inputted packet processor 98.

The IPv6 header 52a (see FIG. 10) is stuck to the front field of the IP packet 103, and the IPv4 header 45a (see FIG. 8) is stuck next to the IPv6 header 52a.

The destination address 46 in the IPv4 header 45a of the IP packet 103 corresponds to the destination address 39a in the sixth embodiment, and the destination address 53 in the IPv6 header 52a corresponds to the destination address 39b in the sixth embodiment.

When the inputted packet processor 98 receives the IP packet 103, the destination address 53 in the IPv6 header 52a is inputted to a static routing table 9, and the destination address 46 in the IPv4 header 45a is inputted to a dynamic routing table 100.

Other than the points explained above, the construction and functions in the eighteenth embodiment are substantially the same as those in the sixth embodiment, of which the repetitive explanations are therefore omitted. Substantially the same effects as those in the sixth embodiment can be obtained in the eighteenth embodiment.

Note that the construction in each of the fifteenth through eighteenth embodiments may be combined with the construction in the fifth embodiment. That is, the inputted packet processor in each of the fifteenth through eighteenth embodiments may be provided with the comparing unit 29, the OR circuit 30 and the write processing unit 33 shown in FIG. 5.

Nineteenth Embodiment

Next, the communication device in a nineteenth embodiment of the present invention will be described. The nineteenth embodiment has the points common to the third embodiment, and hence the discussion will be focused on only different points.

Figure 23:
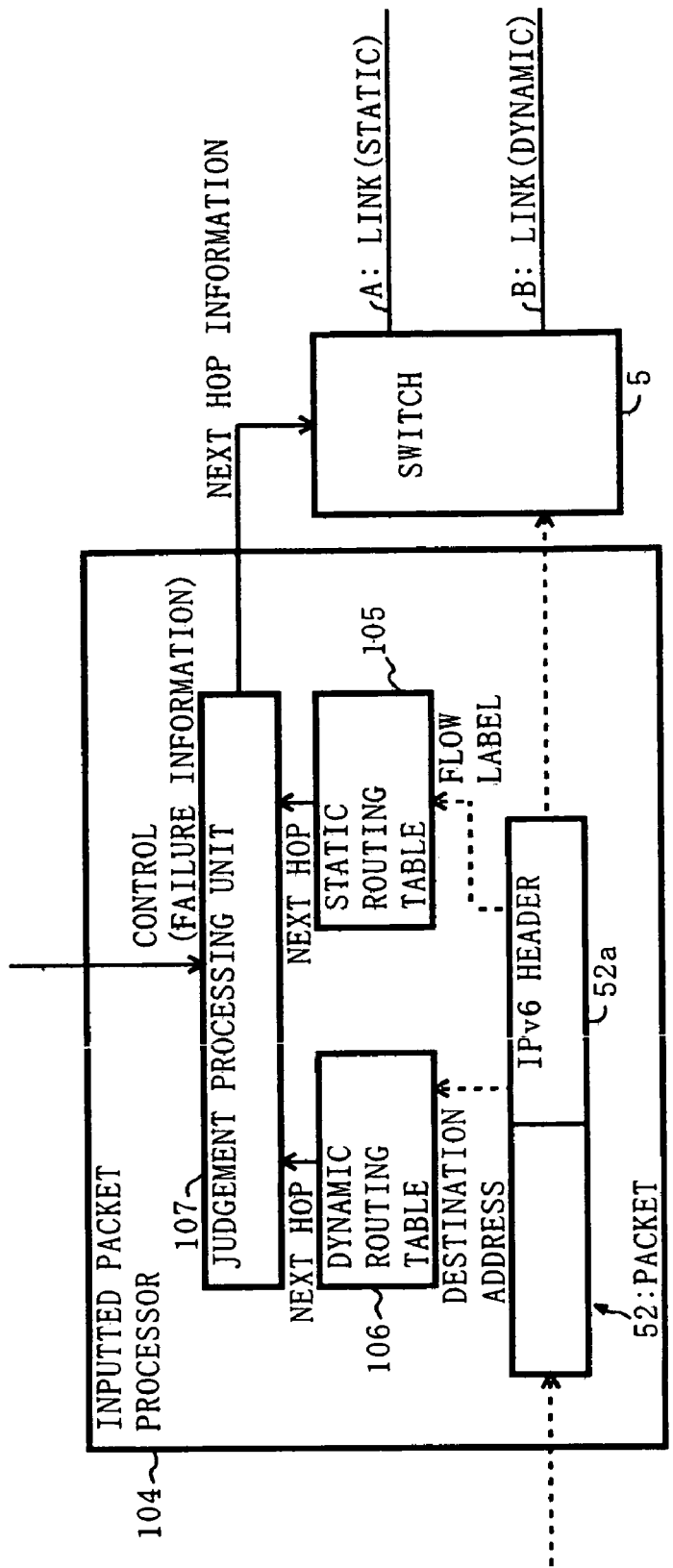
FIG. 23 is a diagram showing construction of the inputted packet processor in a nineteenth embodiment.

FIG. 23 is a diagram showing construction of an inputted packet processor 104 in the nineteenth embodiment. The IP packet 52 (see FIG. 9) received by the line interface unit Z is inputted to the inputted packet processor 104. The IPv6 header 52a (see FIG. 10) is stuck to the IP packet 52.

When the IP packet 52 is inputted to the inputted packet processor 104, the flow label 53a (see FIG. 10) in the IPv6 header 52a is inputted to a static routing table 105. The flow label 53a is used as a piece of identification information about a route of the virtual circuit, and corresponds to the virtual circuit number (virtual circuit information) 18b in the third embodiment.

The static routing table 105 functions to, when the flow label 53a is inputted thereto, input the next hop information (link A) corresponding to the flow label 53a to a judgement processing unit 107. On the other hand, the destination address 53 in the IPv6 header 52a is inputted to a dynamic routing table 106. The destination address 53 corresponds to the address 18a in the third embodiment.

Other than the points explained above, the construction and functions in the nineteenth embodiment are substantially the same as those in the third embodiment, of which the repetitive explanations are therefore omitted. Substantially the same effects as those in the third embodiment can be obtained in the nineteenth embodiment.

Twentieth Embodiment

Figure 24:
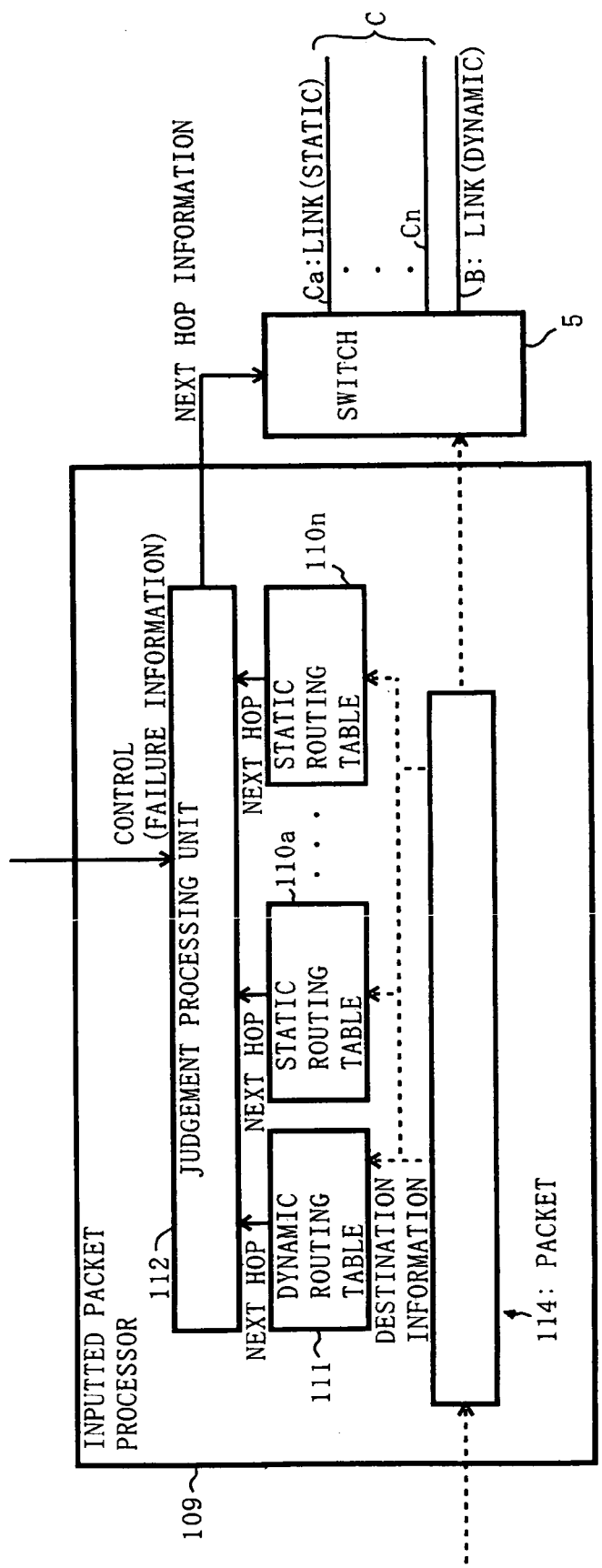
FIG. 24 is a diagram showing construction of the inputted packet processor in a twentieth embodiment.

Next, the communication device in a twentieth embodiment of the present invention will be described. FIG. 24 is a diagram showing construction of an inputted packet processor 109 provided in the communication device in the twentieth embodiment.

Referring to FIG. 24, the inputted packet processor 109 includes a plurality (n-pieces) of static routing tables 110a~110n (110a, 110b, 110c, ..., 110n), a dynamic routing table 111 and a judgement processing unit 112.

A packet 114 received by the line interface unit Z is inputted to the inputted packet processor 109. The packet 114 contains a piece of destination information thereof. When the inputted packet processor 109 receives the packet 114, the destination information in the packet 114 is inputted to each of the static routing tables 110a–10n and the dynamic routing table 111.

Each of the static routing tables 110a~110n has the same structure as the static routing table 2 in the first embodiment. To be specific, each of the static routing tables 110a–110n is stored with the next hop information corresponding to the destination information. Each of the static routing tables 110a~110n functions to, when the destination information is inputted, input to the judgement processing unit 112 the next hop information corresponding to the inputted destination information. The reason why the plurality (n-pieces) of static routing tables 110a–110n are provided lies in such a scheme that the packet 114, even if a failure occur in the route selected by a certain static routing table, can be forwarded via a route selected by other static routing table. Namely, the static routing tables 110a–110n are provided for attaining multiplex static routes (redundant configurations). Therefore, the static routing tables 110a–110n output different pieces of next hop information with respect to a certain piece of destination information.

The dynamic routing table 111 has the same structure as the dynamic routing table 3 in the first embodiment. That is, the dynamic routing table 111 retains the next hop information corresponding to the destination information and inputs, when the destination information is inputted, the next hop information corresponding to the inputted destination information to the judgement processing unit 112.

The judgement processing unit 112 receives the next hop information from the static routing tables 110a–110n and the dynamic routing table 111. Further, the judgement processing unit 112, as in the first embodiment, receives failure information about plural pieces (n-pieces) of links C (Ca, Cb, ..., Cn) as the routes to be selected by the static routing tables 110a–110n.

The judgement processing unit 112, based on the priority given to the pieces of next hop information when selected, selects one piece of next hop information among the plural pieces of next hop information inputted, and inputs the selected next hop information to the switch 5. In this example, the judgement processing unit 112 selects the next hop information given the top priority out of the static routing table 110*a*. Thereafter, the judgement processing unit 112 selects the next hop information in sequence of the static routing table 110*b* (unillustrated), the static routing table 110*c* (unillustrated), . . . , 110*n*, and finally selects the next hop information from the dynamic routing table 111.

With this processing, the judgement processing unit 112, when receiving the next hop information from the static routing tables 110*a*–10*n* and the dynamic routing table 112, and if receiving the failure information about a route (e.g., the link C1) corresponding to the next hop information from the static routing table 110*a*, selects the next hop information (the next hop information (link Cb) from the static routing table 110*b* in this example) corresponding to the next priority, and supplies the selected information to the switch 5.

The judgement processing unit 112, if receiving the failure information about all the links corresponding to the next hop information received from the static routing tables 110*a*–110*n*, selects the next hop information (link B) received from the dynamic routing table 111, and supplies this piece of next hop information to a switch 5.

The switch 5, as in the first embodiment, when the packet 114 is inputted, forwards the packet 114 to the link corresponding to the next hop information received from the judgement processing unit 112.

According to the twentieth embodiment, the plurality of static routing tables are provided, and, if the failure occur in the route to be selected by a given static routing table, the packet 114 is forwarded to the route to be selected by other static routing table.

The packet 114 can be thereby forwarded to the route based on static routing even if the failure occur in the route to be selected by a given static routing table, and the policy can be reflected in the network. Then, if the failures occur in all the routes based on static routing, the packet 114 is forwarded to a route based on dynamic routing, whereby the reachability of the packet 114 can be secured as in the first embodiment.

Twenty First Embodiment

Figure 25:
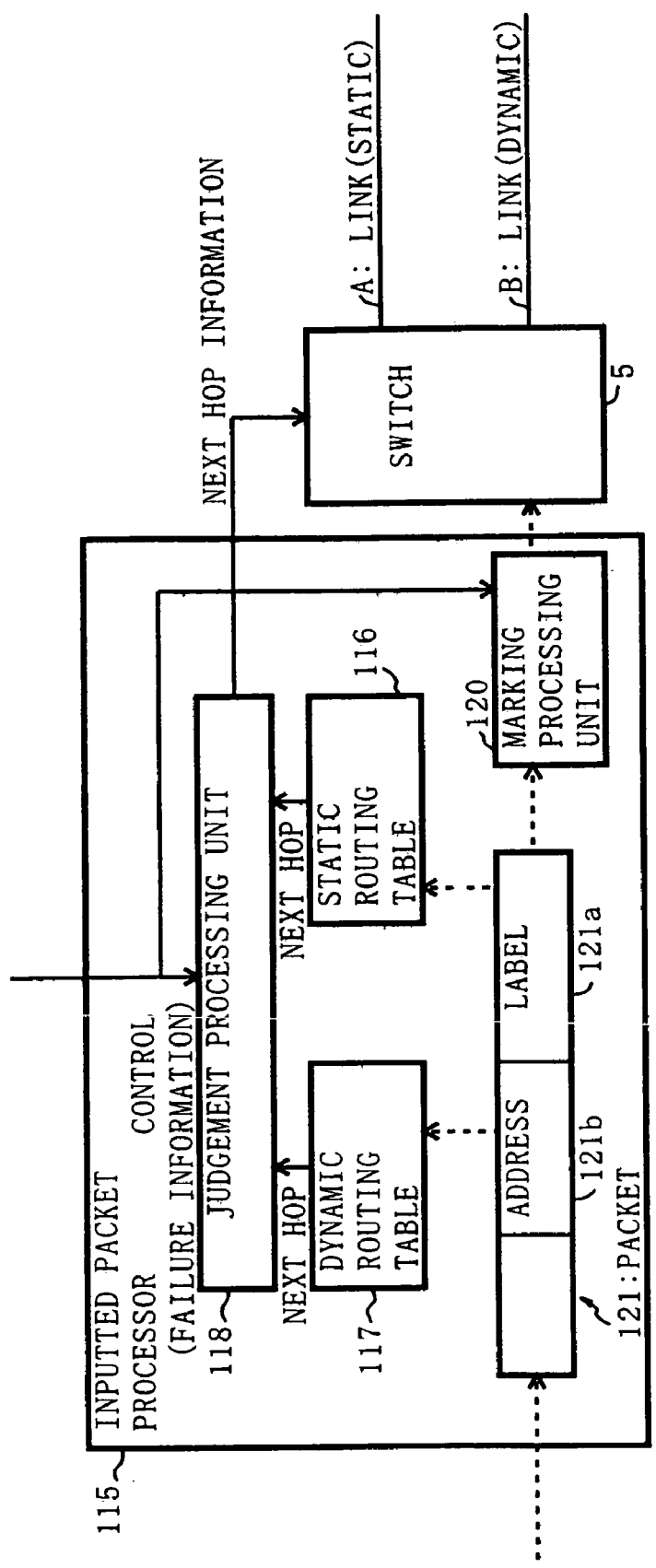
FIG. 25 is a diagram showing construction of the inputted packet processor in a twenty first embodiment.

Next, the communication device in a twenty first embodiment of the present invention will be explained. FIG. 25 is a diagram showing construction of an inputted packet processor 115 provided in the communication device in the twenty first embodiment. The inputted packet processor 115 includes a static routing table 116, a dynamic routing table 117, a judgement processing unit 118 and a marking process unit 120.

The inputted packet processor 115 receives a packet 121 received by the line interface unit Z. The packet 121 contains a label 121*a* and a destination address 121*b* as pieces of destination information.

When the packet 121 is inputted to the inputted packet processor 115, the label 121*a* of the packet 121 is inputted to the static routing table 116, and the destination address 121*b* is inputted to the dynamic routing table 117.

Functions of the static routing table 116, the dynamic routing table 117, a judgement processing unit 118 and a switch 119, are substantially the same as those in the inputted packet processor 19 (see FIG. 4) in the fourth embodiment, and hence their explanations are omitted.

If the failure occur in the link A selected as a next hop by the static routing table 116, a signal (failure information) indicating the failure continues to be inputted to the judgement processing unit 118 and to the marking process unit 120 during a period till that failure is troubleshot.

The judgement processing unit 118, for the duration of the input of the failure information, supplies the switch 5 with the next hop information received from the dynamic routing table 117, thereby selecting a route based on dynamic routing.

The marking process unit 120, after the packet 121 has been inputted, inputs this packet 121 to the switch 5. The marking process unit 120, if no failure information is received, does not execute any processing upon the inputted packet 121 and inputs the packet 121 intact to the switch 5. Namely, the marking process unit 120 simply lets the packet 121 through.

While on the other hand, the marking process unit 120, for the duration of the receipt of the failure information, executes marking with respect to the inputted packet 121 by padding a predetermined mark into a header or user field. Thereafter, the marking process unit 120 inputs the packet 121 to the switch 5. The predetermined mark is, e.g., predetermined bits or a bit string. The packet 121 forwarded from the switch 5 to the route (link B) based on dynamic routing is thereby brought into a state of its having been subjected to marking.

According to the twenty first embodiment, if the failure occur in the static route, marking is effected on the packet 121 to be forwarded to the dynamic route. The packet 121 having been subjected to marking is available for, e.g., the following purposes.

In a case where a network administrator or a service provided using the network provides a user with a service, a fee for providing the service is to be charged on the user in accordance with a packet count of packets used for the user to transmit and receive the data.

The network administrator or the service provider is able to provide the user with a proper service by reflecting the policy in the network on the basis of static routing. If the failure occur in the static route, the dynamic route is selected by the inputted packet processor 115, whereby the reachability of the packet 121 is secured.

If the dynamic route is incapable of reflecting the policy, however, QoS (which is the communication quality) might decline. In this case, the network administrator or the service provider should reduce the service providing fee corresponding to the packet count of the packets forwarded to the dynamic route in consideration of a credibility in the user.

Then, the inputted packet processor 115 executes marking on the packet 121 to be forwarded to the dynamic route. Therefore, the network administrator or the service provider counts the number of the packets 121 having subjected to marking and reduces the service providing fee corresponding to the counted number of the packets 121, thereby making it feasible to provide the user with a proper service in terms of the fee. For example, the service providing fee may be discounted by subtracting the number of packets having subjected to marking from the number of charging target packets used by the user.

What is claimed is:

1. A communication device for selecting a route of a packet, comprising:
   a static routing table storing first routing information of a packet based on static routing, said static routing table is not changed by a change of network topology;
   a dynamic routing table storing second routing information of a packet obtained based on a dynamic routing protocol; and a judging unit obtaining the first and second routing information of the packet from said static routing table and said dynamic routing table; if a failure does not occur in a static route as a route corresponding to the first routing information obtained from said static routing table, selecting the static route as a route to which the packet should be forwarded; and selecting, if the failure occurs in the static route, a dynamic route as a route corresponding to the second routing information obtained from said dynamic routing table, instead of the static route.

2. A communication device according to claim 1, further comprising:
a forwarding unit forwarding the packet to the route corresponding to a result of the selection by said judging unit.

3. A communication device according to claim 1, wherein the packet contains a search key common to said static routing table and said dynamic muting table, and
said judging unit obtains the first and second routing information from said static routing table and said dynamic routing table by use of the search key.

4. A communication device according to claim 3, wherein the packet contains an IPv4 header, and
the search key is a destination address contained in the IPv4 header.

5. A communication device according to claim 3, wherein the packet contains an IPv6 header, and
the search key is a destination address contained in the IPv6 header.

6. A communication device according to claim 1, wherein the packet contains a first search key as a search key of said static routing table and a second search key as a search key of said dynamic routing table, and
said judging unit obtains the first and second routing information from said static routing table and said dynamic routing table by use of the first and second search keys.

7. A communication device according to claim 6, wherein the first search key is virtual circuit information contained in the packet, and
the second search key is a unique destination address contained in the packet.

8. A communication device according to claim 7, wherein if the packet contains plural pieces of virtual circuit information, a predetermined piece of virtual circuit information is used as the first search key.

9. A communication device according to claim 1, further comprising:
a writing unit writing, when transmitting a packet through the dynamic route to another communication device having the same construction as that of said communication device, special information for said other communication device to select the dynamic route to the packet that should be transmitted.

10. A communication device according to claim 1, wherein said judging unit selects the dynamic route if special information is written to the packet.

11. A communication device for selecting a route of a packet, comprising:
a static routing table storing first routing information of a packet based on static routing;
a dynamic routing table storing second routing information of a packet obtained based on a dynamic routing protocol; and
a judging unit obtaining the first and second routing information of the packet from said static routing table and said dynamic routing table; if a failure does not occur in a static route as a route corresponding to the first routing information obtained from said static routing table, selecting the static route as a route to which the packet should be forwarded, and selecting, if the failure occurs in the static route, a dynamic route as a route corresponding to the second routing information obtained from said dynamic routing table, instead of the static route,
wherein the packet contains a first search key as a search key of said static routing table and a second search key as a search key of said dynamic routing table, and
said judging unit obtains the first and second routing information from said static routing table and said dynamic routing table by use of the first and second search keys, and wherein the first search key and second search key are two pieces of unique destination addresses different from each other.

12. A communication device according to claim 11, wherein the packet contains a first IPv4 header and a second IPv4 header,
the first search key is a destination address contained in the first IPv4 header, and
the second search key is a destination address contained in the second IPv4 header.

13. A communication device according to claim 11, wherein the packet contains a first IPv6 header and a second IPv6 header,
the first search key is a destination address contained in the first IPv6 header, and
the second search key is a destination address contained in the second IPv6 header.

14. A communication device according to claim 11, wherein the packet contains the IPv4 header and the IPv6 header,
the first search key is a destination address contained in the first IPv4 header, and
the second search key is a destination address contained in the second IPv6 header.

15. A communication device according to claim 11, wherein the packet contains the IPv4 header and the IPv6 header,
the first search key is a destination address contained in the first IPv6 header, and
the second search key is a destination address contained in the second IPv4 header.

16. A communication device for selecting a route of a packet, comprising:
a static routing table storing first routing information of a packet based on static routing;
a dynamic routing table storing second routing information of a packet obtained based on a dynamic routing protocol; and
a judging unit obtaining the first and second routing information of the packet from said static routing table and said dynamic routing table; if failure do not occur in a static route as a route corresponding to the first routing information obtained from said static routing table, selecting the static route as a route to which the packet should be forwarded; and selecting, if the failure occurs in the static route, a dynamic route as a route corresponding to the second routing information obtained from said dynamic routing table, instead of the static route,
wherein the packet contains a first search key as a search key of said static routing table and a second search key as a search key of said dynamic routing table, and said judging unit obtains the first and second routing information from said static routing table and said dynamic routing table by use of the first and second search keys, wherein the first search key is virtual circuit information contained in the packet, and the second search key is a unique destination address contained in the packet, and wherein the packet contains a MPLS shim header and the IPv4 header, the virtual circuit information is a label value contained in the MPLS shim header, and the unique destination address is a destination address contained in the IPv4 header.

17. A communication device for selecting a route of a packet, comprising:
a static routing table storing first routing information of a packet based on static routing;
a dynamic routing table storing second routing information of a packet obtained based on a dynamic routing protocol; and
a judging unit obtaining the first and second routing information of the packet from said static routing table and said dynamic routing table; if a failure does not occur in a static route as a route corresponding to the first routing information obtained from said static routing table, selecting the static route as a route to which the packet should be forwarded; and selecting, if the failure occurs in the static route, a dynamic route as a route corresponding to the second routing information obtained from said dynamic routing table, instead of the static route,
wherein the packet contains a first search key as a search key of said static routing table and a second search key as a search key of said dynamic routing table, and
said judging unit obtains the first and second routing information from said static routing table and said dynamic routing table by use of the first and second search keys,
wherein the first search key is virtual circuit information contained in the packet, and
the second search key is a unique destination address contained in the packet, and
wherein the packet contains the mpls shim header and the IPv6 header,
the virtual circuit information is the label value contained in the mpls shim header, and
the unique destination address is the destination address contained in the IPv6 header.

18. A communication device for selecting a route of a packet, comprising:
a static routing table storing first routing information of a packet based on static routing;
a dynamic routing table storing second routing information of a packet obtained based on a dynamic routing protocol; and
a judging unit obtaining the first and second routing information of the packet from said static routing table and said dynamic routing table; if a failure does not occur in a static route as a route corresponding to the first routing information obtained from said static routing table, selecting the static route as a route to which the packet should be forwarded; and selecting, if the failure occurs in the static route, a dynamic route as a route corresponding to the second routing information obtained from said dynamic routing table, instead of the static route,
wherein the packet contains a first search key as a search key of said static routing table and a second search key as a search key of said dynamic routing table, and
said judging unit obtains the first and second routing information from said static routing table and said dynamic routing table by use of the first and second search keys,
wherein the first search key is virtual circuit information contained in the packet, and
the second search key is a unique destination address contained in the packet, and
wherein the packet contains an ST2 header based on a streaming protocol and the IPv4 header,
the virtual circuit information is a uniqueID contained in the ST2 header, and
the unique destination address is the destination address contained in the IPv4 header.

19. A communication device for selecting a route of a packet, comprising:
a static routing table storing first routing information of a packet based on static routing;
a dynamic routing table storing second routing information of a packet obtained based on a dynamic routing protocol; and
a judging unit obtaining the first and second routing information of the packet from said static routing table and said dynamic routing table; if a failure does not occur in a static route as a route corresponding to the first routing information obtained from said static routing table, selecting the static route as a route to which the packet should be forwarded; and selecting, if the failure occurs in the static route, a dynamic route as a route corresponding to the second muting information obtained from said dynamic routing table, instead of the static route,
wherein the packet contains a first search key as a search key of said static routing table and a second search key as a search key of said dynamic routing table, and
said judging unit obtains the first and second routing information from said static routing table and said dynamic routing table by use of the first and second search keys,
wherein the first search key is virtual circuit information contained in the packet, and
the second search key is a unique destination address contained in the packet, and
wherein the packet contains the ST2 header based on the streaming protocol and the IPv6 header,
the virtual circuit information is the uniqueID contained in the ST2 header, and
the unique destination address is the destination address contained in the IPv6 header.

20. A communication device for selecting a route of a packet, comprising:
a static routing table storing first routing information of a packet based on static routing;
a dynamic routing table storing second routing information of a packet obtained based on a dynamic routing protocol; and
a judging unit obtaining the fist and second routing information of the packet from said static routing table and said dynamic routing table; if a failure does not occur in a static route as a route corresponding to the first routing information obtained from said static routing table, selecting the static route as a route to which the packet should be forwarded; and selecting, if the failure occurs in the static route, a dynamic route as a route corresponding to the second routing information obtained from said dynamic routing table, instead of the static route, wherein the packet contains a first search key as a search key of said static routing table and a second search key as a search key of said dynamic routing table, and said judging unit obtains the first and second routing information from said static routing table and said dynamic routing table by use of the first and second search keys, wherein the first search key is virtual circuit information contained in the packet, and the second search key is a unique destination address contained in the packet, and wherein the packet contains the IPv6 header, the virtual circuit information is a flow label contained in IPv6 header, and the unique destination address is a destination address contained in the second IPv6 header.

21. A communication device for selecting a route of a packet, comprising:
   a plurality of static routing tables storing first routing information of the packet based on static routing;
   a dynamic routing table storing second routing information of the packet obtained based on a dynamic routing protocol; and
   a judging unit obtaining the first and second routing information of the packet from said static routing tables and said dynamic routing table; if failure do not occur in all of static routes as routes corresponding to the first routing information, selecting any one of the static routes as a route to which the packet should be forwarded; and selecting, if the failure occur in all the static routes, a dynamic route as a route corresponding to the second routing information obtained from said dynamic routing table, instead of the static routes.

22. A communication device for selecting a route of a packet, comprising:
   a static routing table storing first routing information of a packet based on static routing;
   a dynamic routing table storing second routing information of a packet obtained based on a dynamic routing protocol; and
   a judging unit obtaining the first and second routing information of the packet from said static routing table and said dynamic routing table; if a failure does not occur in a static route as a route corresponding to the first routing information obtained from said static routing table, selecting the static route as a route to which the packet should be forwarded; and selecting, if the failure occurs in the static route, a dynamic route as a route corresponding to the second routing information obtained from said dynamic routing table, instead of the static route,
   wherein the packet contains a first search key as a search key of said static routing table and a second search key as a search key of said dynamic routing table, and
   said judging unit obtains the first and second routing information from said static routing table and said dynamic routing table by use of the first and second search keys,
   wherein the first search key is virtual circuit information contained in the packet, and
   the second search key is a unique destination address contained in the packet, and further comprising:
   a marking process unit adding, if the dynamic route is selected, a mark for indicating forwarding via the dynamic route into the packet that should be forwarded to the selected dynamic route.

23. A method for selecting a route of a packet by a communication device, comprising steps of:
   providing a static routing table storing first routing information of the packet based on static routing, said static routing table is not changed by a change of network topology, and a dynamic routing table storing second routing information of the packet obtained based on a dynamic routing protocol;
   obtaining the first and second routing information from said static routing table and from said dynamic routing table; and
   selecting, if a failure does not occur in a static route as a route corresponding to the first routing information, a static route as a route to which the packet should be forwarded, and selecting, if the failure occurs in the static route, a dynamic route as a route corresponding to the second routing information, instead of the static route.

24. A method according to claim 23, further comprising a step of:
   forwarding the packet to the route in accordance with a result of the selection by said judging unit.

25. A method according to claim 23, wherein the packet contains a search key common to said static routing table and said dynamic routing table, and
   the first and second routing information is obtained from said static routing table and said dynamic routing table by use of the search key.

26. A method according to claim 23, wherein the packet contains a first search key as a search key of said static routing table and a second search key as a search key of said dynamic routing table, and
   the first and second routing information is obtained by use of the first and second search keys respectively from said static routing table and said dynamic routing table.

27. A method according to claim 26, wherein the first search key is virtual circuit information contained in the packet, and
   the second search key is a unique destination address contained in the packet.

28. A method according to claim 27, wherein if the packet contains plural pieces of virtual circuit information, a predetermined piece of virtual circuit information is used as the first search key.

29. A method according to claim 23, further comprising a step of:
   writing, when transmitting a packet through the dynamic route to another communication device, special information for said other communication device to select the dynamic route to this packet.

30. A method according to claim 23, wherein if the special information is written to the packet, the dynamic route is selected.

31. A method for selecting a route of a packet by a communication device, comprising steps of:
   providing a static routing table storing first routing information of a packet based on static routing, and a dynamic routing table storing second routing information of a packet obtained based on a dynamic routing protocol;
   obtaining the first and second routing information from said static routing table and from said dynamic routing table; and
   selecting, if a failure does not occur in a static route as a route corresponding to the first routing information, a static route as a route to which the packet should be forwarded, and selecting, if the failure occurs in the static route, a dynamic route as a route corresponding to the second routing information, instead of the static route, wherein the packet contains a first search key as a search key of said static routing table and a second search key as a search key of said dynamic routing table, and the first and second routing information is obtained by use of the first and second search keys respectively from said static routing table and said dynamic routing table, wherein the first search key is virtual circuit information contained in the packet, and the second search key is a unique destination address contained in the packet, wherein if the packet contains plural pieces of virtual circuit information, a predetermined piece of virtual circuit information is used as the first search key, and wherein the first search key and second search key are two pieces of unique destination addresses different from each other.

32. A communication device for selecting a route of a packet, comprising:

a first routing unit selecting a route, which is not changed by a change of network topology, for guaranteeing a communication quality of the packet; and a second routing unit selecting a route for securing reachability of the packet, the route of the packer is selected by use of one of said first routing unit and said second routing unit in accordance with a predetermined condition, wherein, with respect to forwarding packets, a packet route selected by said first routing unit is used when a failure of a packet route selected by said first routing unit does not occur, and the packet route selected by said second routing unit is used when a failure of the packet route selected by said first routing unit occurs.

* * * * *

UNITED STATES PATENT AND TRADEMARK OFFICE
CERTIFICATE OF CORRECTION

PATENT NO.        : 7,075,932 B2  
APPLICATION NO.   : 09/769908  
DATED             : July 11, 2006  
INVENTOR(S)       : N. Matsuhira and A. Takeyama Page 1 of 1

It is certified that error appears in the above-identified patent and that said Letters Patent is hereby corrected as shown below:

Claim 3 column 23, line 19: " -said dynamic muting table- " should be changed to -- --said dynamic routing table-- --.

Claim 19 column 26, line 33: "-the second muting information-" should be -- --the second routing information-- --.

Signed and Sealed this

Twenty-first Day of August, 2007

JON W. DUDAS  
*Director of the United States Patent and Trademark Office*